US012000311B2

(12) United States Patent
Terada et al.

(10) Patent No.: US 12,000,311 B2
(45) Date of Patent: Jun. 4, 2024

(54) NOZZLE MODULE, NOZZLE DIAPHRAGM, STEAM TURBINE, METHOD FOR ASSEMBLING NOZZLE DIAPHRAGM, METHOD FOR ASSEMBLING STEAM TURBINE, AND METHOD FOR DISASSEMBLING STEAM TURBINE

(71) Applicant: MITSUBISHI HEAVY INDUSTRIES COMPRESSOR CORPORATION, Tokyo (JP)

(72) Inventors: Katsumi Terada, Hiroshima (JP); Yuzo Tsurusaki, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/158,043

(22) Filed: Jan. 23, 2023

(65) Prior Publication Data

US 2023/0235677 A1 Jul. 27, 2023

(30) Foreign Application Priority Data

Jan. 25, 2022 (JP) ................................ 2022-009380

(51) Int. Cl.
*F01D 9/04* (2006.01)

(52) U.S. Cl.
CPC .......... *F01D 9/044* (2013.01); *F05D 2220/31* (2013.01); *F05D 2230/60* (2013.01); *F05D 2230/70* (2013.01); *F05D 2240/128* (2013.01)

(58) Field of Classification Search
CPC ........ F01D 9/04; F01D 9/044; F05D 2230/70; F05D 2240/128
See application file for complete search history.

(56) References Cited

U.S. PATENT DOCUMENTS

| | | | | | |
|---|---|---|---|---|---|
| 4,025,229 | A * | 5/1977 | Browning | F01D 9/044 415/209.2 |
| 8,702,385 | B2 * | 4/2014 | Burdgick | F01D 1/02 29/889.22 |
| 10,094,245 | B2 * | 10/2018 | Imparato | F01D 1/023 |
| 2020/0157958 | A1 | 5/2020 | Takemoto et al. | |

FOREIGN PATENT DOCUMENTS

| | | | | |
|---|---|---|---|---|
| EP | 1582698 | A1 * | 10/2005 | A61L 2/238 |
| JP | 2020-084768 | A | 6/2020 | |

* cited by examiner

*Primary Examiner* — Courtney D Heinle
*Assistant Examiner* — Danielle M. Christensen
(74) *Attorney, Agent, or Firm* — Osha Bergman Watanabe & Burton LLP

(57) ABSTRACT

A nozzle module includes a nozzle body having a blade shape in a cross section and extending in a radial direction, and a platform member integrally connected to each end portion of the nozzle body in the radial direction. The platform member includes a first portion formed on a first side in an axial direction in which a central axis extends, and having a pair of first side surfaces extending in the axial direction, when viewed in the radial direction, and a second portion formed to extend to a second side in the axial direction with respect to the first portion, and having a second side surface extending obliquely with respect to the first side surface, when viewed in the radial direction.

14 Claims, 17 Drawing Sheets

NOZZLE MODULE, NOZZLE DIAPHRAGM, STEAM TURBINE, METHOD FOR ASSEMBLING NOZZLE DIAPHRAGM, METHOD FOR ASSEMBLING STEAM TURBINE, AND METHOD FOR DISASSEMBLING STEAM TURBINE

BACKGROUND OF THE INVENTION

Field of the Invention

The present disclosure relates to a nozzle module, a nozzle diaphragm, a steam turbine, a method for assembling a nozzle diaphragm, a method for assembling a steam turbine, and a method for disassembling a steam turbine.

Priority is claimed on Japanese Patent Application No. 2022-9380, filed on Jan. 25, 2022, the content of which is incorporated herein by reference.

Description of Related Art

A steam turbine mainly includes a rotor that rotates around an axis and a casing that covers the rotor from an outside and forms a steam flow path between the rotor and the casing. The rotor has a rotary shaft extending along the axis and a plurality of rotor blades arrayed on an outer peripheral surface of the rotary shaft. A nozzle diaphragm having a plurality of stator blades (nozzles) arrayed to be alternated with the plurality of rotor blades in an axial direction is disposed on an inner peripheral surface of the casing.

As a specific example of this nozzle diaphragm, a nozzle diaphragm disclosed in Patent Document 1 is known. The nozzle diaphragm disclosed in Patent Document 1 includes a nozzle having an inner shroud in contact with an outer peripheral surface of an inner ring and a nozzle body having an integral structure protruding outward from the inner shroud in a radial direction, and an outer shroud ring having a through-hole penetrating in the radial direction so that an outer peripheral end portion of each nozzle body is inserted into the through-hole.

[Patent Document 1] Japanese Unexamined Patent Application, First Publication No. 2020-84768.

SUMMARY OF THE INVENTION

However, according to a configuration disclosed in Patent Document 1, the outer peripheral end portion of the nozzle body needs to penetrate the through-hole of the outer shroud ring. Therefore, particularly in a bow nozzle in which the nozzle body is three-dimensionally curved, high machining accuracy is required for the nozzle body and the through-hole formed in the outer shroud ring. In addition, when the nozzle diaphragm is assembled, a high skill is required to align the nozzle body in an annular shape, and thus, a worker who carries out assembly work is limited to a highly skilled worker. As a result, there is a problem in that manufacturing the nozzle diaphragm is troublesome and costly.

The present disclosure provides a nozzle module, a nozzle ring, a steam turbine, a method for assembling a nozzle ring, a method for assembling a steam turbine, and a method for disassembling a steam turbine, which enables a highly accurate nozzle ring to be easily and reliably manufactured.

According to the present disclosure, there is provided a nozzle module forming a nozzle ring to be disposed between an inner ring extending in a circumferential direction around a central axis and an outer ring disposed outward of the inner ring in a radial direction from the central axis and extending in the circumferential direction. The nozzle module includes a nozzle body having a blade shape in a cross section and extending in the radial direction, and a platform member integrally connected to an end portion of the nozzle body in the radial direction. The platform member includes a first portion formed on a first side in an axial direction in which the central axis extends at the platform member, and having a pair of first side surfaces extending in the axial direction, when viewed in the radial direction, and a second portion formed to extend to a second side in the axial direction with respect to the first portion at the platform member, and having a second side surface extending obliquely with respect to the first side surface, when viewed in the radial direction.

According to the present disclosure, there is provided a nozzle diaphragm including the nozzle module configured as described above, an inner ring disposed inside the nozzle module in the radial direction and extending in the circumferential direction, and an outer ring disposed outside the nozzle module in the radial direction and extending in the circumferential direction. A plurality of the nozzle modules are aligned between the inner ring and the outer ring to form a nozzle ring.

According to the present disclosure, there is provided a steam turbine including the nozzle diaphragm configured as described above, a casing disposed outside the nozzle diaphragm in the radial direction, extending in the axial direction, and having a tubular shape, and a rotor disposed to be rotatable around the central axis with respect to the nozzle diaphragm and the casing, and accommodated in the casing.

According to the present disclosure, there is provided a method for assembling a nozzle ring which is a method for assembling the nozzle diaphragm configured as described above. The method includes a step of preparing the inner ring, the outer ring, and the plurality of nozzle modules, a step of disposing the inner ring, a step of disposing each of the plurality of nozzle modules outside the inner ring in the radial direction, a step of disposing the outer ring outside the plurality of nozzle modules in the radial direction, a step of welding the inner ring and the platform member, and a step of welding the outer ring and the platform member.

According to the present disclosure, there is provided a method for assembling a steam turbine. The method includes a step of preparing a casing, and a step of incorporating the nozzle diaphragm configured as described above into the casing.

According to the present disclosure, there is provided a method for disassembling a steam turbine. The method includes a step of opening a part of a casing, and a step of removing the nozzle diaphragm configured as described above from the casing.

According to the nozzle module, the nozzle diaphragm, the steam turbine, the method for assembling the nozzle diaphragm, the method for assembling the steam turbine, and the method for disassembling the steam turbine in the present disclosure, it is possible to easily and reliably manufacture a highly accurate nozzle ring.

DETAILED DESCRIPTION OF THE INVENTION

Hereinafter, embodiments for implementing a nozzle module, a nozzle diaphragm, a steam turbine, a method for assembling a nozzle diaphragm, a method for assembling a steam turbine, and a method for disassembling a steam turbine according to the present disclosure will be described with reference to the accompanying drawings. However, the present disclosure is not limited only to the embodiments.

(Configuration of Steam Turbine)

Figure 1:
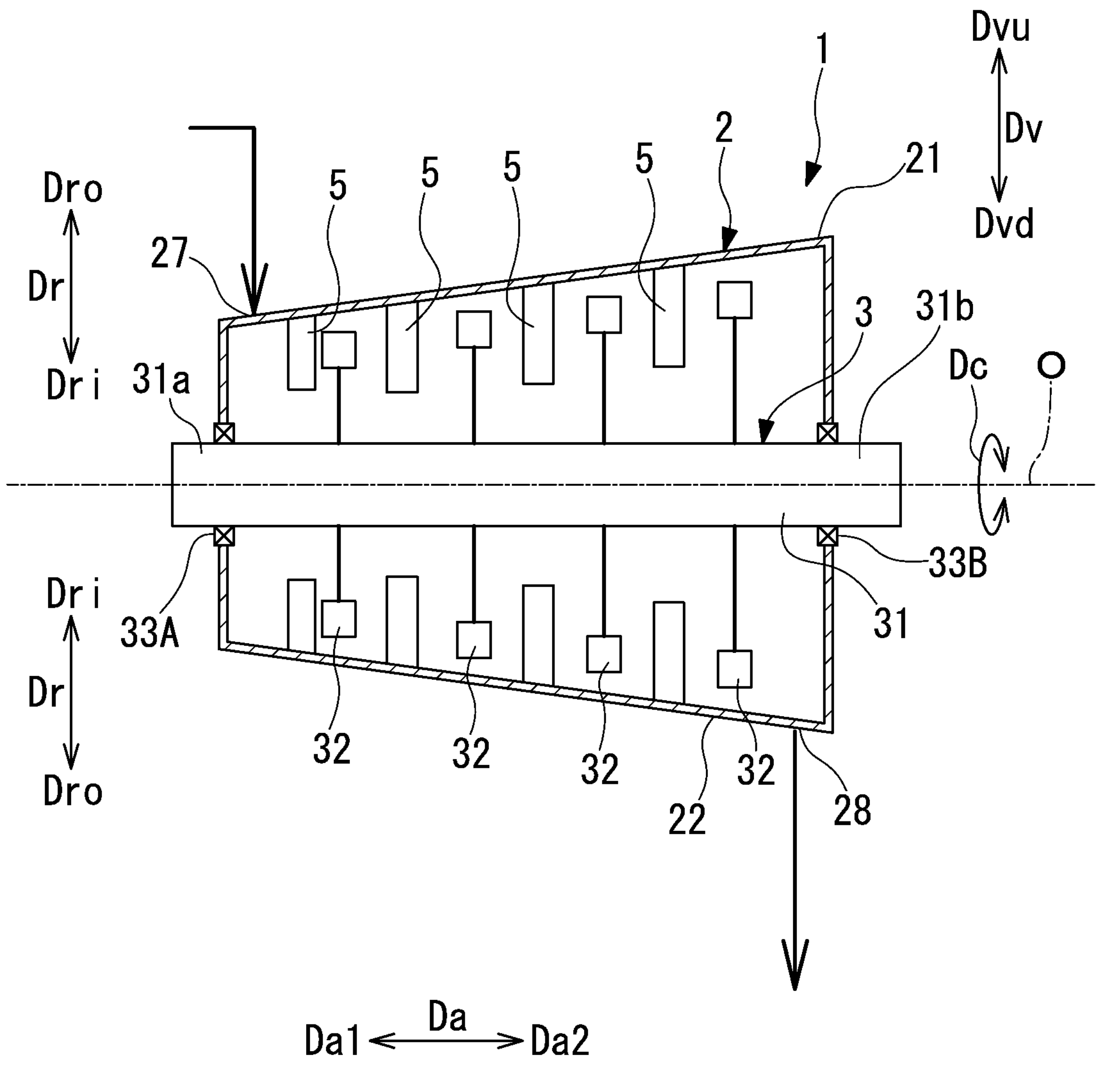
FIG. 1 is a view showing a schematic configuration of a steam turbine according to an embodiment of the present disclosure.

A steam turbine 1 is rotationally driven by converting energy of steam into rotational energy. As shown in FIG. 1, the steam turbine 1 includes a casing 2, a rotor 3, and a nozzle diaphragm 5.

(Configuration of Casing)

The casing 2 is formed in a tubular shape extending in an axial direction Da around a central axis O of the rotor 3. The casing 2 has a steam inlet 27 for introducing the steam into the casing 2 and a steam outlet 28 for discharging the steam outward from the casing 2. In the present embodiment, the casing 2 has an upper half casing 21 disposed upward Dvu in a vertical direction Dv with reference to the central axis O of the rotor 3, and a lower half casing 22 disposed downward Dvd.

The upper half casing 21 extends in a circumferential direction Dc. The upper half casing 21 has a semi-annular shape formed around the central axis O in a cross section orthogonal to the central axis O. The upper half casing 21 is open downward Dvd in the vertical direction Dv to accommodate the rotor 3 and the nozzle diaphragm 5. The upper half casing 21 has an upper half casing split surfaces (not shown) in both ends in the circumferential direction Dc.

The lower half casing 22 extends in the circumferential direction Dc. The lower half casing 22 has a semi-annular shape formed around the central axis O in a cross section orthogonal to the central axis O. An inner diameter of the lower half casing 22 is formed to have the same size as an inner diameter of the upper half casing 21. The lower half casing 22 is open upward Dvu in the vertical direction Dv to accommodate the rotor 3 and the nozzle diaphragm 5. The lower half casing 22 has lower half casing split surfaces (not shown) in both ends in the circumferential direction Dc. The upper half casing 21 is placed upward Dvu of the lower half casing 22 in the vertical direction Dv. The upper half casing 21 and the lower half casing 22 are fixed by a fastening member such as a bolt (not shown) in a state where the upper half casing split surface and the lower half casing split surface are in contact with each other. In this manner, the casing 2 is formed.

(Configuration of Rotor)

The rotor 3 includes a rotary shaft 31 and a rotor blade 32. The rotor 3 is covered with the casing 2 from an outer side Dro in the radial direction Dr from the central axis O (around the central axis O).

The rotary shaft 31 has a cylindrical shape extending along the axial direction Da. Each of both end portions 31*a* and 31*b* of the rotary shaft 31 in the axial direction Da is supported to be rotatable around the central axis O by a first bearing 33A and a second bearing 33B. The rotary shaft 31 is accommodated inside the casing 2.

The rotor blades 32 are arrayed in a plurality of stages at an interval in the axial direction Da of the rotary shaft 31. Each of the rotor blades 32 extends from an outer peripheral surface of the rotary shaft 31 toward the outer side Dro in the radial direction Dr.

(Configuration of Nozzle Diaphragm)

Figure 2:
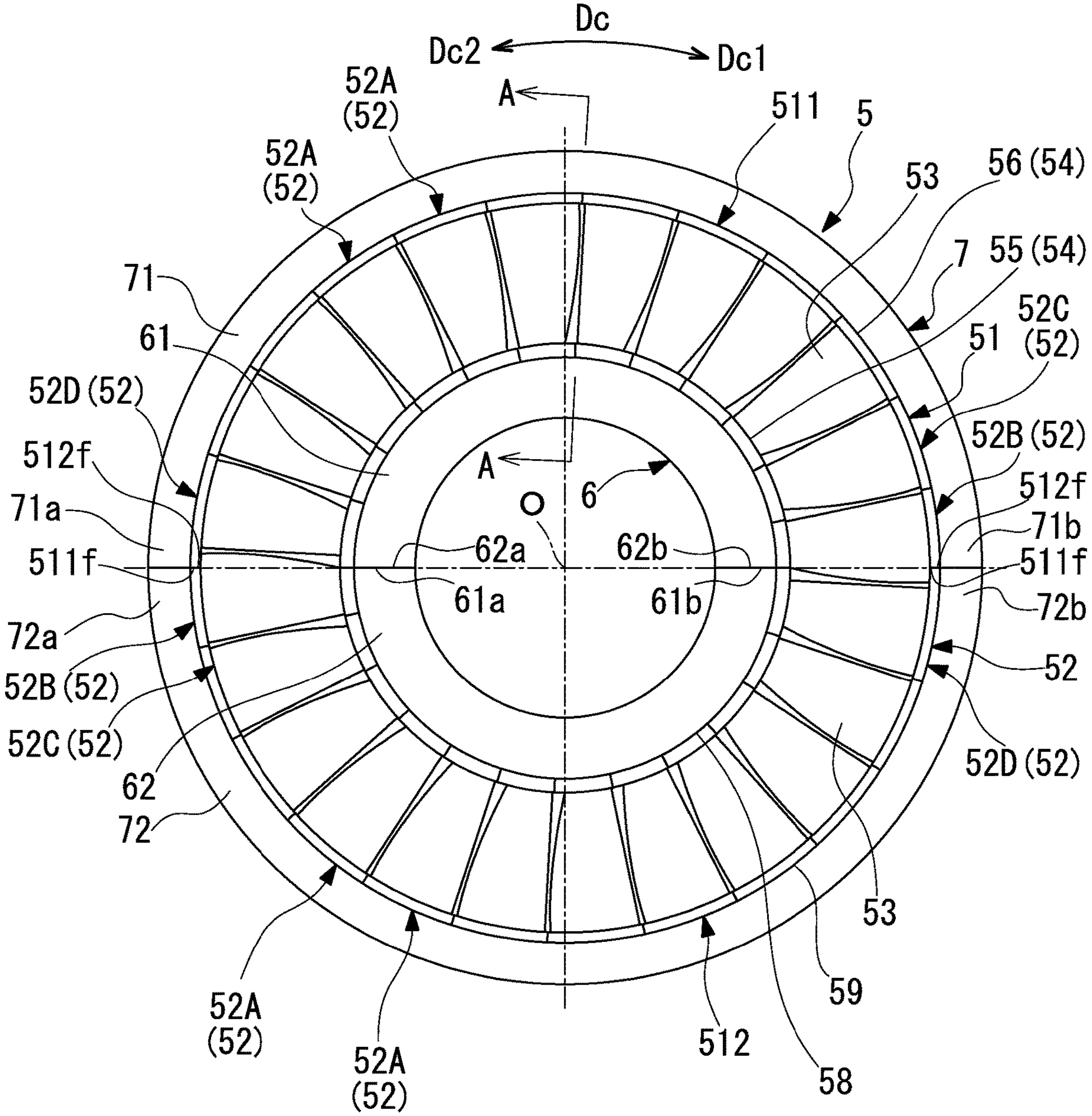
FIG. 2 is a view when a nozzle diaphragm of the steam turbine is viewed in an axial direction.
Figure 3:
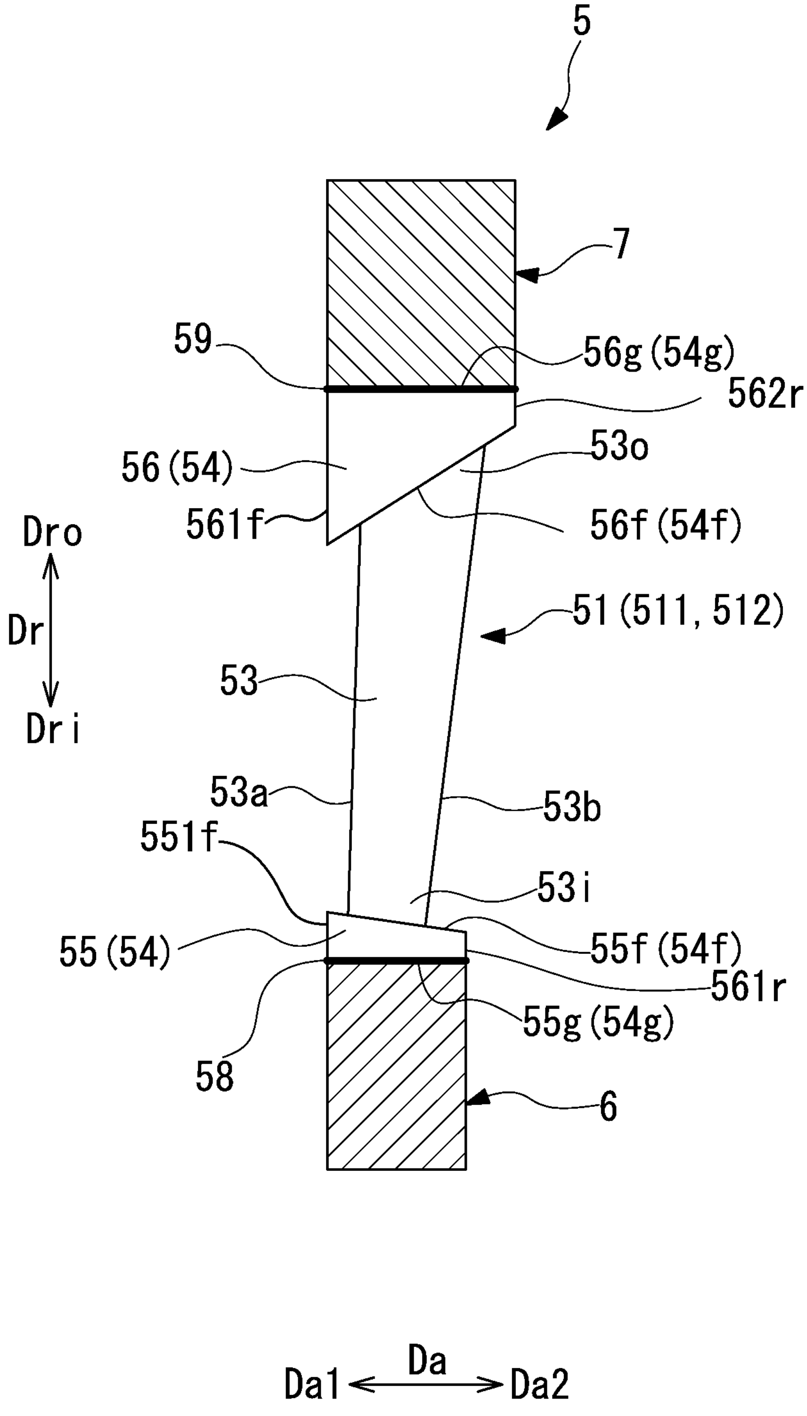
FIG. 3 is a sectional view taken along a line A-A in FIG. 2.

A plurality of the nozzle diaphragms 5 are arrayed at an interval in the axial direction Da inside the casing 2. Each of the nozzle diaphragms 5 is disposed on the outer side Dro of the rotary shaft 31 in the radial direction Dr. Each of the nozzle diaphragms 5 is alternately disposed with the rotor blade 32 in each stage in the axial direction Da. Each of the nozzle diaphragms 5 has an annular shape formed around the central axis O. As shown in FIGS. 2 and 3, each of the nozzle diaphragms 5 of the present embodiment includes an inner ring 6, an outer ring 7, and a nozzle ring 51.

The inner ring 6 is disposed on the outer side Dro in the radial direction Dr of the rotary shaft 31 (refer to FIG. 1). As shown in FIG. 2, the inner ring 6 extends in the circumferential direction Dc. The inner ring 6 has an annular shape formed around the central axis O. The inner ring 6 is disposed on an inner side Dri of the nozzle ring 51 in the radial direction Dr. The inner ring 6 has an upper half inner ring member 61 disposed upward Dvu in the vertical direction Dv with reference to the central axis O of the rotor 3, and a lower half inner ring member 62 disposed downward Dvd.

The upper half inner ring member 61 extends in the circumferential direction Dc. The upper half inner ring member 61 has a semi-annular shape formed around the central axis O. The upper half inner ring member 61 is open downward Dvd in the vertical direction Dv. The lower half inner ring member 62 extends in the circumferential direction Dc. The lower half inner ring member 62 has a semi-annular shape formed around the central axis O. The inner diameter of the lower half inner ring member 62 is formed to have the same size as the inner diameter of the upper half inner ring member 61. The lower half inner ring member 62 is open upward Dvu in the vertical direction Dv. The upper half inner ring member 61 is placed upward Dvu of the lower half inner ring member 62 in the vertical direction Dv. Both end portions 61*a* and 61*b* of the upper half inner ring member 61 in the circumferential direction Dc and both end portions 62*a* and 62*b* of the lower half inner ring member 62 in the circumferential direction Dc are fixed by a fastening member such as a bolt (not shown) in a state where both are in contact with each other. In this manner, the inner ring 6 is formed.

The outer ring 7 is disposed on the inner side Dri of the casing 2 in the radial direction Dr. The outer ring 7 extends in the circumferential direction Dc. The outer ring 7 has an annular shape formed around the central axis O. The outer ring 7 is disposed on the outer side Dro of the nozzle ring 51 in the radial direction Dr. The outer ring 7 has an upper half outer ring member 71 disposed upward Dvu in the vertical direction Dv with reference to the central axis O of the rotor 3, and a lower half outer ring member 72 disposed downward Dvd.

The upper half outer ring member 71 extends in the circumferential direction Dc. The upper half outer ring member 71 has a semi-annular shape formed around the central axis O. The upper half outer ring member 71 is open downward Dvd in the vertical direction Dv. The lower half outer ring member 72 extends in the circumferential direction Dc. The lower half outer ring member 72 has a semi-annular shape formed around the central axis O. An inner diameter of the lower half outer ring member 72 is formed to have the same size as an inner diameter of the upper half outer ring member 71. The lower half outer ring member 72 is open upward Dvu in the vertical direction Dv. The upper half outer ring member 71 is placed upward Dvu of the lower half outer ring member 72 in the vertical direction Dv. Both end portions 71*a* and 71*b* of the upper half outer ring member 71 in the circumferential direction Dc and both end portions 72*a* and 72*b* of the lower half outer ring member 72 in the circumferential direction Dc are fixed by a fastening member such as a bolt (not shown) in a state where both are in contact with each other. In this manner, the outer ring 7 is formed.

(Configuration of Nozzle Ring)

The nozzle ring 51 is disposed between the inner ring 6 and the outer ring 7. As a whole, the nozzle ring 51 has an annular shape formed around the central axis O. The nozzle ring 51 is disposed on the outer side Dro of the inner ring 6 in the radial direction Dr, and is disposed on the inner side Dri of the outer ring 7 in the radial direction Dr. The nozzle ring 51 is configured to include a plurality of nozzle modules 52 aligned in the circumferential direction Dc. The nozzle ring 51 has an upper half nozzle ring 511 disposed upward Dvu in the vertical direction Dv with reference to the central axis O, and a lower half nozzle ring 512 disposed downward Dvd.

The upper half nozzle ring 511 extends in the circumferential direction Dc. The upper half nozzle ring 511 has a semi-annular shape formed around the central axis O. The upper half nozzle ring 511 is open downward Dvd in the vertical direction Dv. The upper half nozzle ring 511 has upper half ring split surfaces 511*f* in both ends in the circumferential direction Dc. An upper half ring split surface 511*f* of the upper half nozzle ring 511 is a horizontal surface facing downward Dvd in the vertical direction Dv.

The lower half nozzle ring 512 extends in the circumferential direction Dc. The lower half nozzle ring 512 has a semi-annular shape formed around the central axis O. An outer diameter and an inner diameter of the lower half nozzle ring 512 are formed to have the same size as an outer diameter and an inner diameter of the upper half nozzle ring 511. The lower half nozzle ring 512 is open upward Dvu in the vertical direction Dv. The lower half nozzle ring 512 has lower half ring split surfaces 512*f* in both ends in the circumferential direction Dc. The lower half ring split surface 512*f* is a horizontal surface facing upward Dvu in the vertical direction Dv. The upper half nozzle ring 511 is placed upward Dvu of the lower half nozzle ring 512 in the vertical direction Dv. The upper half nozzle ring 511 and the lower half nozzle ring 512 are disposed in a state where the upper half ring split surface 511*f* and the lower half ring split surface 512*f* are in contact with each other.

Figure 4:
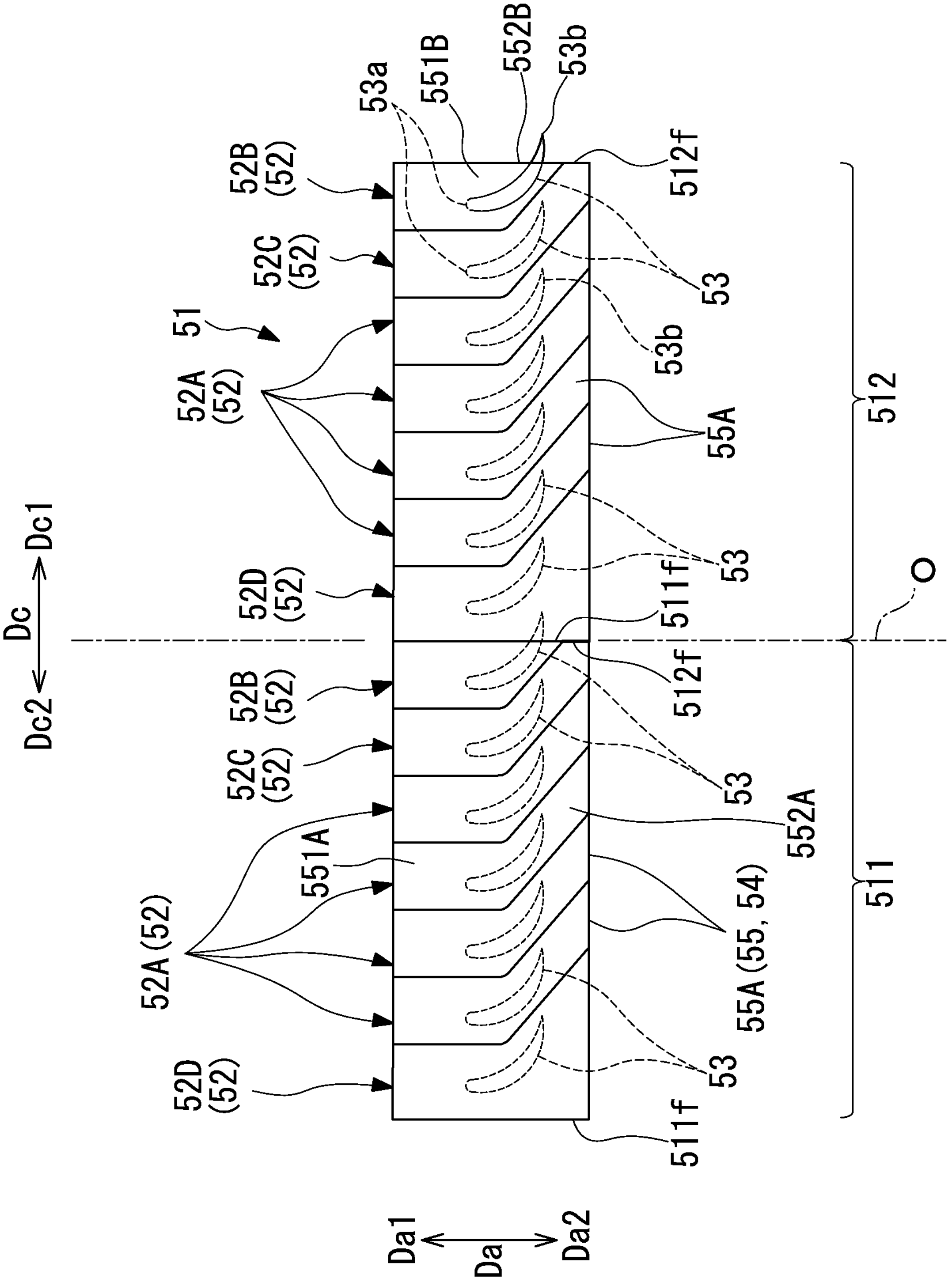
FIG. 4 is an exploded view when each inner platform member of a plurality of nozzle modules forming the nozzle diaphragm in FIG. 2 is viewed from an inside in a radial direction.
Figure 5:
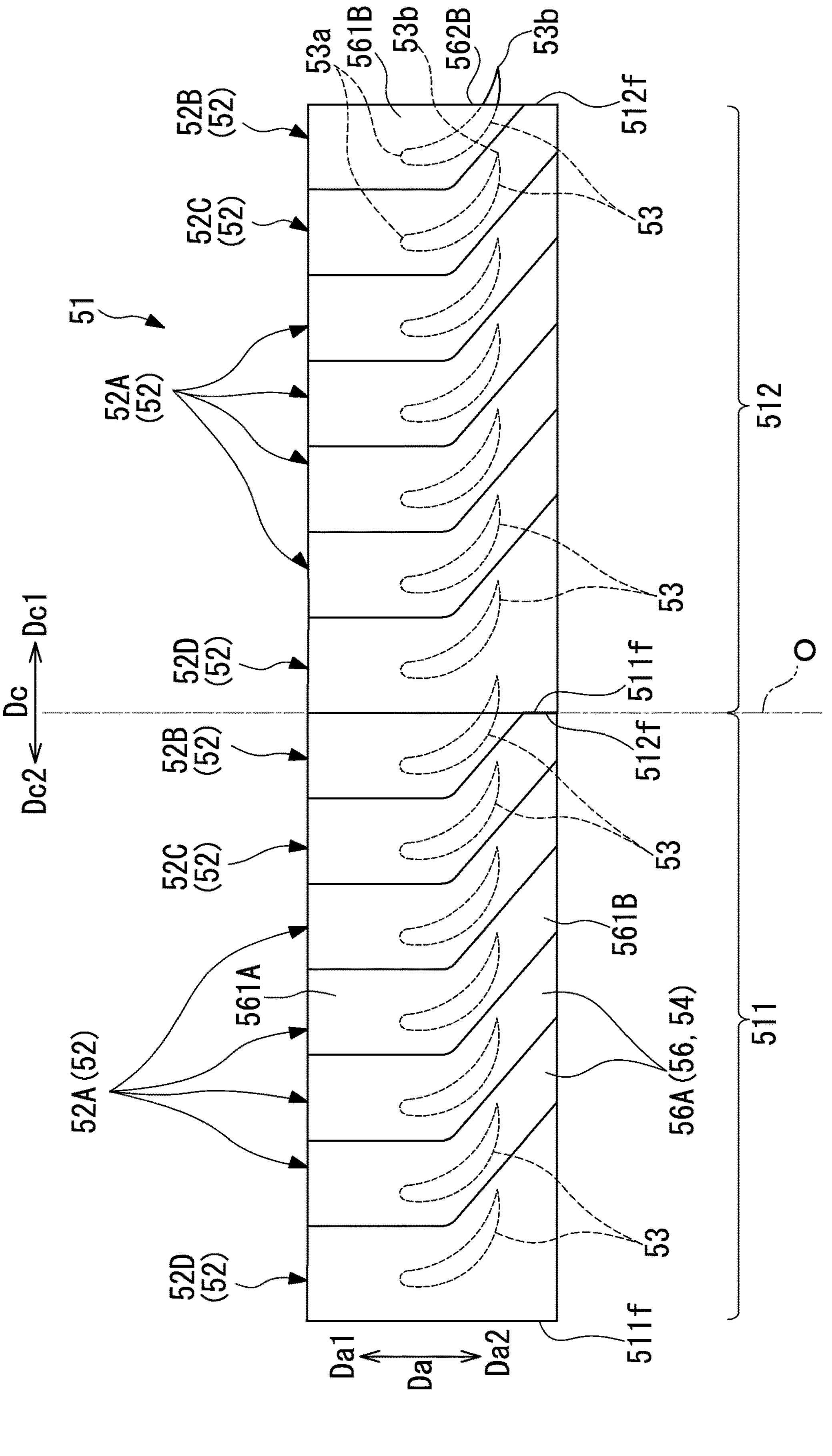
FIG. 5 is an exploded view when each outer platform member of the plurality of nozzle modules forming the nozzle diaphragm in FIG. 2 is viewed from an outside in the radial direction.

The upper half nozzle ring 511 and the lower half nozzle ring 512 are configured to include at a least one nozzle module 52. The least one nozzle module 52 includes a plurality of nozzle modules 52. The upper half nozzle ring 511 and the lower half nozzle ring 512 are configured to include the plurality of nozzle modules 52 aligned in the circumferential direction Dc. As shown in FIGS. 4 and 5, for example, the upper half nozzle ring 511 and the lower half nozzle ring 512 include a plurality of types of nozzle modules 52A to 52D as the plurality of nozzle modules 52. Specifically, the upper half nozzle ring 511 and the lower half nozzle ring 512 include a first nozzle module 52A, a second nozzle module 52B, a third nozzle module 52C, and a fourth nozzle module 52D as the nozzle modules 52. The second nozzle module 52B, the third nozzle module 52C, and the fourth nozzle module 52D are disposed in a region facing the upper half ring split surface 511*f* and the lower half ring split surface 512*f* in both end portions of the upper half nozzle ring 511 and the lower half nozzle ring 512 in the circumferential direction Dc. A plurality of the first nozzle modules 52A having the same shape are disposed in a region other than a region where the second nozzle module 52B, the third nozzle module 52C, and the fourth nozzle module 52D are disposed.

(Configuration of Nozzle Module)

As shown in FIGS. 2 and 3, the nozzle module 52 forming the nozzle ring 51 (upper half nozzle ring 511 and lower half nozzle ring 512) includes a nozzle body 53 and at least one platform member 54.

As shown in FIGS. 4 and 5, the nozzle body 53 has a blade shape in a cross section when viewed in the radial direction Dr, and extends in the radial direction Dr. In the nozzle body 53, when viewed in the radial direction Dr, an end portion 53*a* forming a front edge of the nozzle body 53 on a first side Da1 in the axial direction Da faces the first side Da1 in the axial direction Da. In the nozzle body 53, when viewed in the radial direction Dr, an end portion 53*b* forming a rear edge of the nozzle body 53 on a second side Da2 in the axial direction Da faces a direction inclined to a first side Dc1 in the circumferential direction Dc with respect to the axial direction Da. Here, the first side Da1 in the axial direction Da is an upstream side in a flow direction of the steam in the steam turbine 1, and is a side where the steam inlet 27 is disposed with respect to the steam outlet 28 in the axial direction Da in the casing 2. In addition, the second side Da2 in the axial direction Da is a downstream side in the flow direction of the steam in the steam turbine 1, and is a side where the steam outlet 28 is disposed with respect to the steam inlet 27 in the axial direction Da in the casing 2. The nozzle body 53 is curved to be recessed toward the second side Dc2 in the circumferential direction Dc between the end portion 53*a* and the end portion 53*b*. The nozzle body 53 is formed in a three-dimensional shape so that a cross section is gradually changed from the inner side Dri toward the outer side Dro in the radial direction Dr.

The platform member 54 is integrally connected to each of both end portions of the nozzle body 53 in the radial direction Dr. The at least one platform member 54 includes a plurality of platform members 54. The platform member 54 has an inner peripheral surface 54*f* connected to the nozzle body 53 and an outer peripheral surface 54*g* facing a side opposite to the inner peripheral surface 54*f* in the radial direction Dr. As shown in FIGS. 2 to 5, the platform member 54 includes an inner platform member 55 and an outer platform member 56.

As shown in FIG. 3, the inner platform member 55 is integrally connected to an inner peripheral end portion 53*i* on the inner side Dri of the nozzle body 53 in the radial direction Dr. The inner platform member 55 has an inner-side inner peripheral surface 55*f* facing the outer side Dro in the radial direction Dr and an inner-side outer peripheral surface 55*g* facing a side opposite to the inner-side inner peripheral surface 55*f* in the radial direction Dr. The inner-side inner peripheral surface 55*f* is an inner peripheral surface 54*f* connected to the nozzle body 53. The inner-side outer peripheral surface 55*g* is an outer peripheral surface 54*g* facing the inner side Dri in the radial direction Dr. The inner-side outer peripheral surface 55*g* extends in the circumferential direction Dc, and is formed parallel to the central axis O when viewed in the circumferential direction Dc. The inner-side outer peripheral surface 55*g* is joined to the inner ring 6 by electron beam welding, for example. That is, the nozzle diaphragm 5 has an inner welding portion 58 between inner ring 6 and inner platform member 55. In addition, in the inner platform member 55, in order to form the inner welding portion 58, a distance between the inner-side inner peripheral surface 55*f* and the inner-side outer peripheral surface 55*g* in the radial direction Dr is set to a length which enables the electron beam welding (EBW) (for example, 10 mm or longer).

Figure 6:
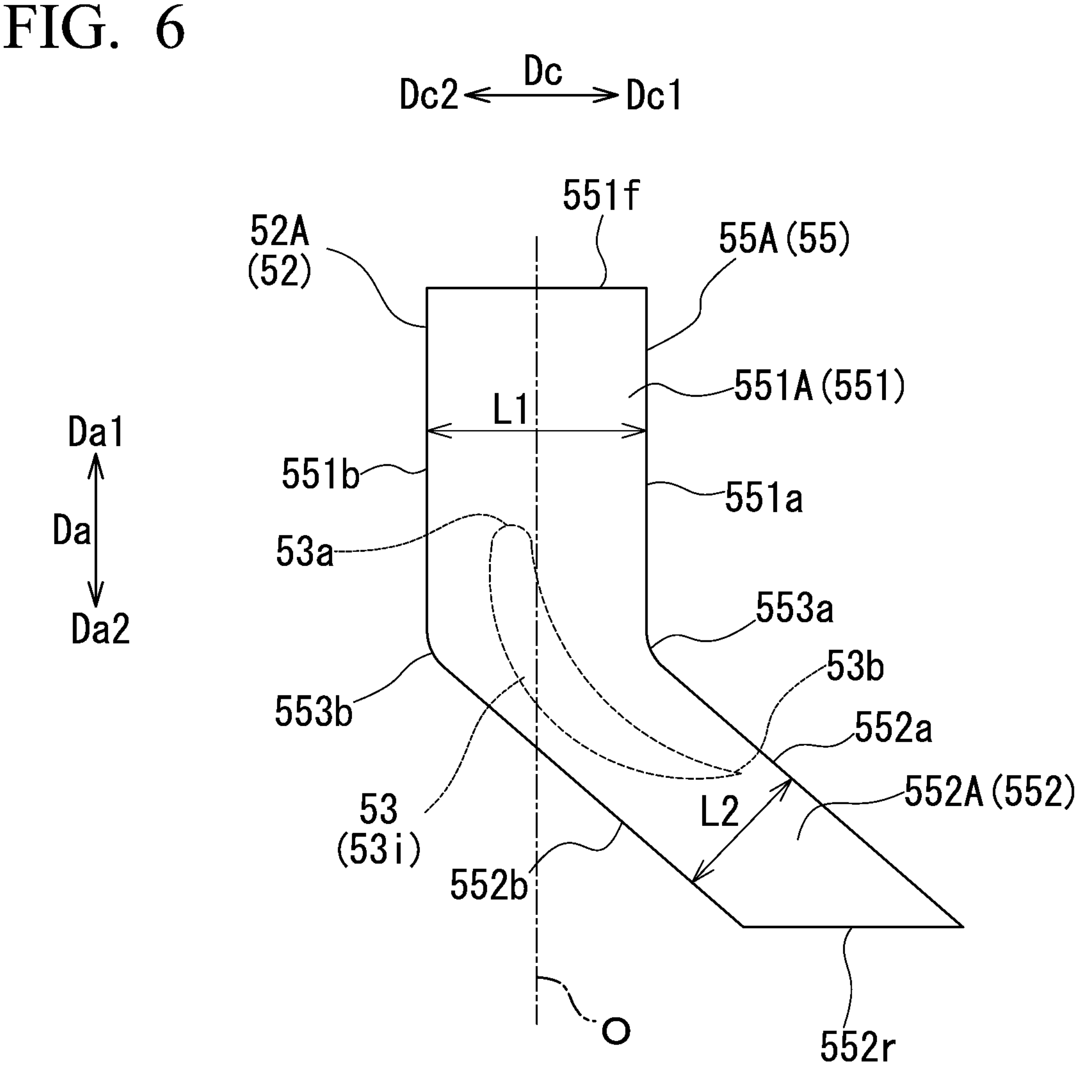
FIG. 6 is a view when an inner platform member of a first nozzle module of the plurality of nozzle modules in FIG. 4 is viewed from the inside in the radial direction.

Furthermore, as shown in FIG. 6, when viewed in the radial direction Dr, the inner platform member 55 has a first inner portion (first portion) 551 formed on the first side Da1 (first area) in the axial direction Da at the inner platform member 55, and a second inner portion (second portion) 552 formed on the second side Da2 (second area) in the axial direction Da at the inner platform member 55.

As shown in FIG. 3, the outer platform member 56 is integrally connected to an outer peripheral end portion 53*o* on the outer side Dro of the nozzle body 53 in the radial direction Dr. The outer platform member 56 has an outer-side inner peripheral surface 56*f* facing the inner side Dri in the radial direction Dr and an outer-side outer peripheral surface 56*g* facing a side opposite to the outer-side inner peripheral surface 56*f* in the radial direction Dr. The outer-side inner peripheral surface 56*f* is an inner peripheral surface 54*f* connected to the nozzle body 53. The outer-side outer peripheral surface 56*g* is an outer peripheral surface 54*g* facing the outer side Dro in the radial direction Dr. The outer-side inner peripheral surface 56*f* is formed to be inclined to the outer side Dro in the radial direction Dr from the first side Da1 toward the second side Da2 in the axial direction Da. The outer-side outer peripheral surface 56*g* extends in the circumferential direction Dc, and is formed parallel to the central axis O when viewed in the circumferential direction Dc. The outer-side outer peripheral surface 56*g* is joined to the outer ring 7 by electron beam welding, for example. That is, the nozzle diaphragm 5 has an outer welding portion 59 between outer ring 7 and outer platform member 56. In addition, in the outer platform member 56, in order to form the outer welding portion 59, a distance between the outer-side inner peripheral surface 56*f* and the outer-side outer peripheral surface 56*g* in the radial direction Dr is set to a length which enables the electron beam welding (EBW) (for example, 10 mm or longer).

Figure 7:
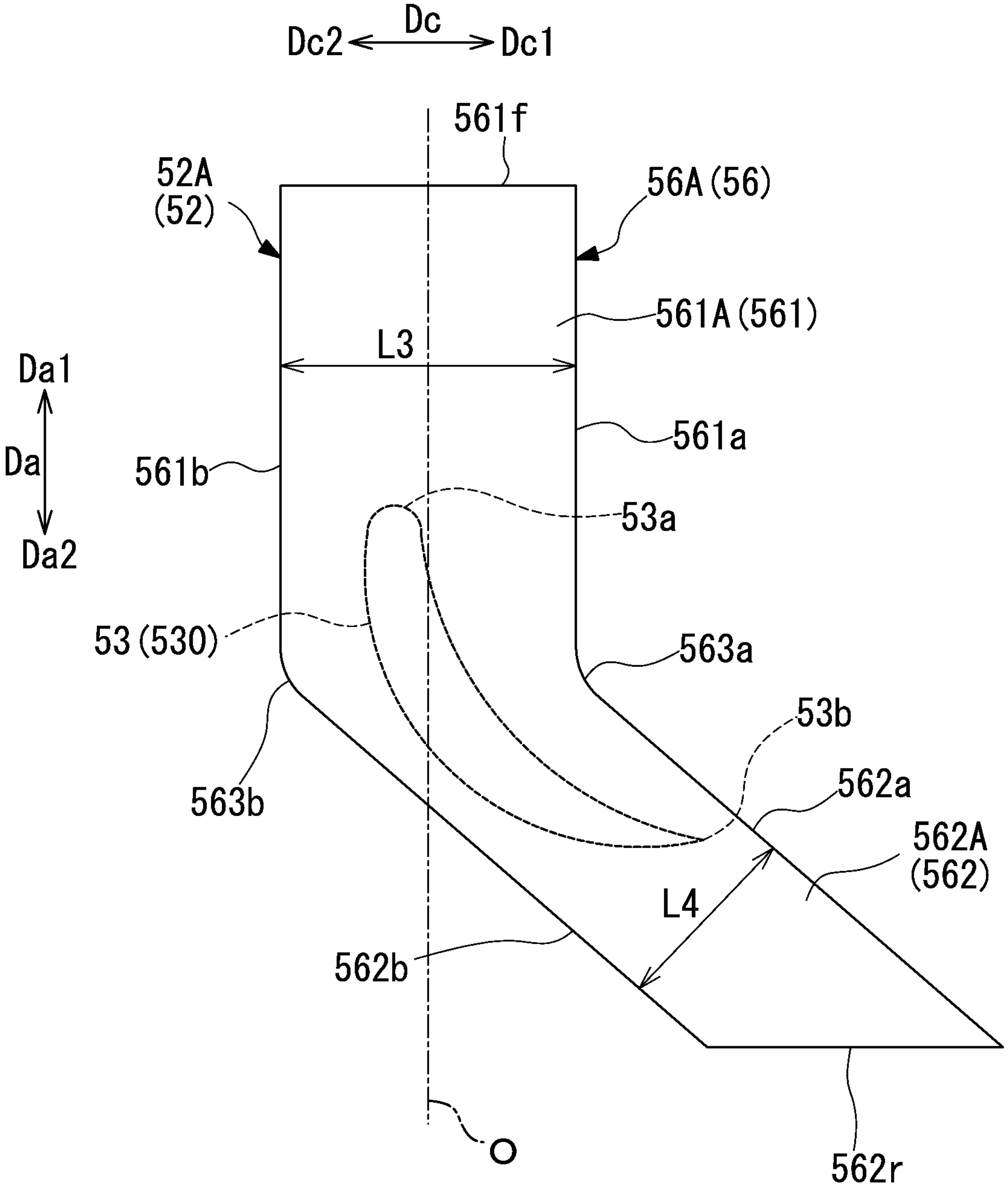
FIG. 7 is a view when an outer platform member of the first nozzle module of the plurality of nozzle modules in FIG. 4 is viewed from the outside in the radial direction.

In addition, as shown in FIG. 7, when viewed in the radial direction Dr, the outer platform member 56 has a first outer portion (first portion) 561 formed on the first side Da1 (first area) in the axial direction Da at the outer platform member 56, and a second outer portion (second portion) 562 formed on the second side Da2 (second area) in the axial direction Da at the outer platform member 56. In the present embodiment, the first inner portion 551 and the first outer portion 561, and the second inner portion 552 and the second outer portion 562 each are formed in different shapes. More specifically, the sizes of the first inner portion 551 and the first outer portion 561, and the sizes of the second inner portion 552 and the second outer portion 562 are different from each other.

Here, a more detailed structure of the nozzle module 52 will be described for each of the first nozzle module 52A to the fourth nozzle module 52D. As shown in FIG. 6, the inner platform member 55A of the first nozzle module 52A integrally has a first inner portion 551A and a second inner portion 552A.

The first inner portion 551A has an inner front surface (front surface) 551*f* and a pair of first inner side surfaces (first side surfaces) 551*a* and 551*b*, when viewed in the radial direction Dr. The inner front surface 551*f* extends in the circumferential direction Dc, when viewed in the radial direction Dr. The inner front surface 551*f* is formed to face the first side Da1 in the axial direction Da. The inner front surface 551*f* intersects with the inner-side inner peripheral surface 55*f*. The inner front surface 551*f* is orthogonal to (intersects with) the inner-side outer peripheral surface 55*g*.

The pair of first inner side surfaces 551*a* and 551*b* each extend in the axial direction Da to be orthogonal to the inner front surface 551*f*, when viewed in the radial direction Dr. The pair of first inner side surfaces 551*a* and 551*b* extend from both ends of the inner front surface 551*f* in the circumferential direction Dc toward the second side Da2 in the axial direction Da. The pair of first inner side surfaces 551*a* and 551*b* extend parallel to each other, when viewed in the radial direction Dr. The pair of first inner side surfaces 551*a* and 551*b* are surfaces facing opposite directions in the circumferential direction Dc. The first inner side surfaces 551*a* and 551*b* intersect with the inner-side inner peripheral surface 55*f*. The first inner side surfaces 551*a* and 551*b* are orthogonal to (intersect with) the inner-side outer peripheral surface 55*g*.

The second inner portion 552A is formed to extend integrally with the first inner portion 551A on the second side Da2 in the axial direction Da. The second inner portion 552A has an inner rear surface (rear surface) 552*r* and a pair of second inner side surfaces (second side surfaces) 552*a* and 552*b*, when viewed in the radial direction Dr.

The inner rear surface 552*r* extends in the circumferential direction Dc, when viewed in the radial direction Dr. The inner rear surface 552*r* is formed to face the second side Da2 in the axial direction Da to be opposite to the inner front surface 551*f*. The inner front surface 551*f* intersects with the inner-side inner peripheral surface 55*f*. The inner front surface 551*f* is orthogonal to (intersects with) the inner-side outer peripheral surface 55*g*.

The pair of second inner side surfaces 552*a* and 552*b* each extend obliquely with respect to the pair of first inner side surfaces 551*a* and 551*b*, when viewed in the radial direction Dr. The pair of second inner side surfaces 552*a* and 552*b* each are inclined toward the first side Dc1 in the circumferential direction Dc as both are directed from the pair of first inner side surfaces 551*a* and 551*b* toward the second side Da2 in the axial direction Da. The second inner side surface 552*a* is connected to the first inner side surface 551*a*, and the second inner side surface 552*b* is connected to the first inner side surface 551*b*. The pair of second inner side surfaces 552*a* and 552*b* extend parallel to each other, when viewed in the radial direction Dr. The pair of second inner side surfaces 552*a* and 552*b* are surfaces facing mutually opposite directions in a direction intersecting with the circumferential direction Dc and the axial direction Da. The first inner side surfaces 551*a* and 551*b* intersect with the inner-side inner peripheral surface 55*f*. The first inner side surfaces 551*a* and 551*b* are orthogonal to (intersect with) the inner-side outer peripheral surface 55*g*. When viewed in the radial direction Dr, an interval L1 between the pair of first inner side surfaces 551*a* and 551*b* is equal to an interval L2 between the pair of second inner side surfaces 552*a* and 552*b*. Here, the interval L1 is a distance in a direction orthogonal to the first inner side surfaces 551*a* and 551*b*, and is a distance between the first inner side surfaces 551*a* and 551*b* in the circumferential direction Dc. In addition, the interval L2 is a distance in a direction orthogonal to the second inner side surfaces 552*a* and 552*b*, and is a distance between the second inner side surfaces 552*a* and 552*b* in a direction intersecting with the circumferential direction Dc and the axial direction Da.

The inner platform member 55A of the first nozzle module 52A has inner curved surfaces (curved surfaces) 553*a* and 553*b* on the first side Da1 and the second side Da2 in the circumferential direction Dc at the inner platform member 55A, when viewed in the radial direction Dr. The inner curved surface 553*a* is curved and smoothly connected between the first inner side surface 551*a* and the second inner side surface 552*a* on the first side Da1 in the circumferential direction Dc of the inner platform member 55A. The inner curved surface 553*a* is a recessed surface recessed when viewed in the radial direction Dr. The inner curved surface 553*b* is curved and smoothly connected between the first inner side surface 551*b* and the second inner side surface 552*b* on the second side Da2 in the circumferential direction Dc of the inner platform member 55A. The inner curved surface 553*b* is a protruding surface protruding when viewed in the radial direction Dr. The inner curved surface 553*b* is formed in a shape overlapping the inner curved surface 553*a* without any gap, when viewed in the radial direction Dr.

The inner platform member 55A of the first nozzle module 52A is connected to an entire region of the inner peripheral end portion 53*i* of the nozzle body 53, when viewed in the radial direction Dr. The first inner portion 551A is disposed to overlap an end portion 53*a* of the nozzle body 53 on the first side Da1 in the axial direction Da, when viewed in the radial direction Dr. The second inner portion 552A is disposed to overlap an end portion 53*b* of the nozzle body 53 on the second side Da2 in the axial direction Da, when viewed in the radial direction Dr.

As shown in FIG. 7, in the first nozzle module 52A, the outer platform member 56A integrally has a first outer portion 561A and a second outer portion 562A.

The first outer portion 561A has an outer front surface (front surface) 561*f* and a pair of first outer side surfaces 561*a* and 561*b*, when viewed in the radial direction Dr.

The outer front surface 561*f* extends in the circumferential direction Dc, when viewed in the radial direction Dr. The outer front surface 561*f* is formed to face the first side Da1 in the axial direction Da. As shown in FIG. 3, the outer front surface 561*f* is disposed at the same position as the inner front surface 551*f* of the inner platform member 55 in the axial direction Da. The outer front surface 561*f* intersects with the outer-side inner peripheral surface 56*f*. The outer front surface 561*f* is orthogonal to (intersects with) the outer-side outer peripheral surface 56*g*.

As shown in FIG. 7, the pair of first outer side surfaces 561*a* and 561*b* each extend in the axial direction Da to be orthogonal to the outer front surface 561*f*, when viewed in the radial direction Dr. The pair of first outer side surfaces 561*a* and 561*b* extend from both ends of the outer front surface 561*f* in the circumferential direction Dc toward the second side Da2 in the axial direction Da. The pair of first outer side surfaces 561*a* and 561*b* extend parallel to each other, when viewed in the radial direction Dr. The pair of first outer side surfaces 561*a* and 561*b* are surfaces facing opposite directions in the circumferential direction Dc. The first outer side surfaces 561*a* and 561*b* intersect with the outer-side inner peripheral surface 56*f*. The first outer side surfaces 561*a* and 561*b* are orthogonal to (intersect with) the outer-side outer peripheral surface 56*g*. An interval L3 between the pair of first outer side surfaces 561*a* and 561*b* may be different from, or may be the same as the interval L1 between the pair of first inner side surfaces 551*a* and 551*b* of the inner platform member 55A. That is, the first outer portion 561A may have the same size (shape) as the first inner portion 551A, or may have a different size (shape). Here, the interval L3 is a distance in the direction orthogonal to the first outer side surfaces 561*a* and 561*b*, and is a distance between the first outer side surfaces 561*a* and 561*b* in the circumferential direction Dc.

The second outer portion 562A is formed to extend integrally with the first outer portion 561A on the second side Da2 in the axial direction Da. The second outer portion 562A has an outer rear surface 562*r* and a pair of second outer side surfaces (second side surfaces) 562*a* and 562*b*, when viewed in the radial direction Dr.

The outer rear surface 562*r* extends in the circumferential direction Dc, when viewed in the radial direction Dr. The outer rear surface 562*r* is formed to face the second side Da2 in the axial direction Da to be opposite to the outer front surface 561*f*. The outer rear surface 562*r* intersects with the outer-side inner peripheral surface 56*f*. The outer rear surface 562*r* is orthogonal to (intersects with) the outer-side outer peripheral surface 56*g*.

The pair of second outer side surfaces 562*a* and 562*b* each extend obliquely with respect to the pair of first outer side surfaces 561*a* and 561*b*, when viewed in the radial direction Dr. The pair of second outer side surfaces 562*a* and 562*b* are inclined toward the first side Dc1 in the circumferential direction Dc as both are directed from the pair of first outer side surfaces 561*a* and 561*b* toward the second side Da2 in the axial direction Da. The second outer side surface 562*a* is connected to the first outer side surface 561*a*, and the second outer side surface 562*b* is connected to the first outer side surface 561*b*. The pair of second outer side surfaces 562*a* and 562*b* extend parallel to each other, when viewed in the radial direction Dr. The pair of second outer side surfaces 562*a* and 562*b* are surfaces facing mutually opposite directions in a direction intersecting with the circumferential direction Dc and the axial direction Da. The first outer side surfaces 561*a* and 561*b* intersect with the outer-side inner peripheral surface 56*f*. The first outer side surfaces 561*a* and 561*b* are orthogonal to (intersect with) the outer-side outer peripheral surface 56*g*. When viewed in the radial direction Dr, the interval L3 between the pair of first outer side surfaces 561*a* and 561*b* and the interval L4 between the pair of second outer side surfaces 562*a* and 562*b* are equal to each other. In addition, the interval L4 between the pair of second outer side surfaces 562*a* and 562*b* is larger than the interval L2 between the pair of second inner side surfaces 552*a* and 552*b* of the inner platform member 55A. Here, the interval L4 is a distance in the direction orthogonal to the second outer side surfaces 562*a* and 562*b*, and is a distance between the second outer side surfaces 562*a* and 562*b* in the direction intersecting with the circumferential direction Dc and the axial direction Da.

The interval L4 may be different from, or may be the same as the interval L2. In addition, inclination of the pair of second outer side surfaces 562*a* and 562*b* may be different from, or may be the same as inclination of the pair of second inner side surfaces 552*a* and 552*b* of the inner platform member 55A. That is, the first outer portion 561A may have the same size (shape) as the first inner portion 551A, or may have a different size (shape).

The outer platform member 56A of the first nozzle module 52A has outer curved surfaces (curved surfaces) 563*a* and 563*b* on the first side Da1 and the second side Da2 in the circumferential direction Dc at the outer platform member 56A, when viewed in the radial direction Dr. The outer curved surface 563*a* is curved and smoothly connected between the first outer side surface 561*a* and the second outer side surface 562*a* on the first side Da1 in the circumferential direction Dc of the outer platform member 56A. The outer curved surface 563*a* is a recessed surface recessed when viewed in the radial direction Dr. The outer curved surface 563*b* is curved and smoothly connected between the first outer side surface 561*b* and the second outer side surface 562*b* on the second side Da2 in the circumferential direction Dc of the outer platform member 56A. The outer curved surface 563*b* is a recessed surface recessed when viewed in the radial direction Dr. The outer curved surface 563*b* is formed in a shape overlapping the outer curved surface 563*a* without any gap, when viewed in the radial direction Dr. The outer curved surfaces 563*a* and 563*b* may have the same curvature as the inner curved surfaces 553*a* and 553*b* of the inner platform member 55A, or may have a different curvature, when viewed in the radial direction Dr.

The outer platform member 56A of the first nozzle module 52A is connected to an entire region of the outer peripheral end portion 53*o* of the nozzle body 53, when viewed in the radial direction Dr. The first outer portion 561A is disposed to overlap the end portion 53*a* of the nozzle body 53 on the first side Da1 in the axial direction Da, when viewed in the radial direction Dr. The second outer portion 562A is disposed to overlap the end portion 53*b* of the nozzle body 53 on the second side Da2 in the axial direction Da, when viewed in the radial direction Dr.

As shown in FIGS. 4 and 5, the second nozzle module 52B of the plurality of nozzle modules 52 is disposed in an end portion on the first side Dc1 in the circumferential direction Dc in the upper half nozzle ring 511 and the lower half nozzle ring 512.

Figure 8:
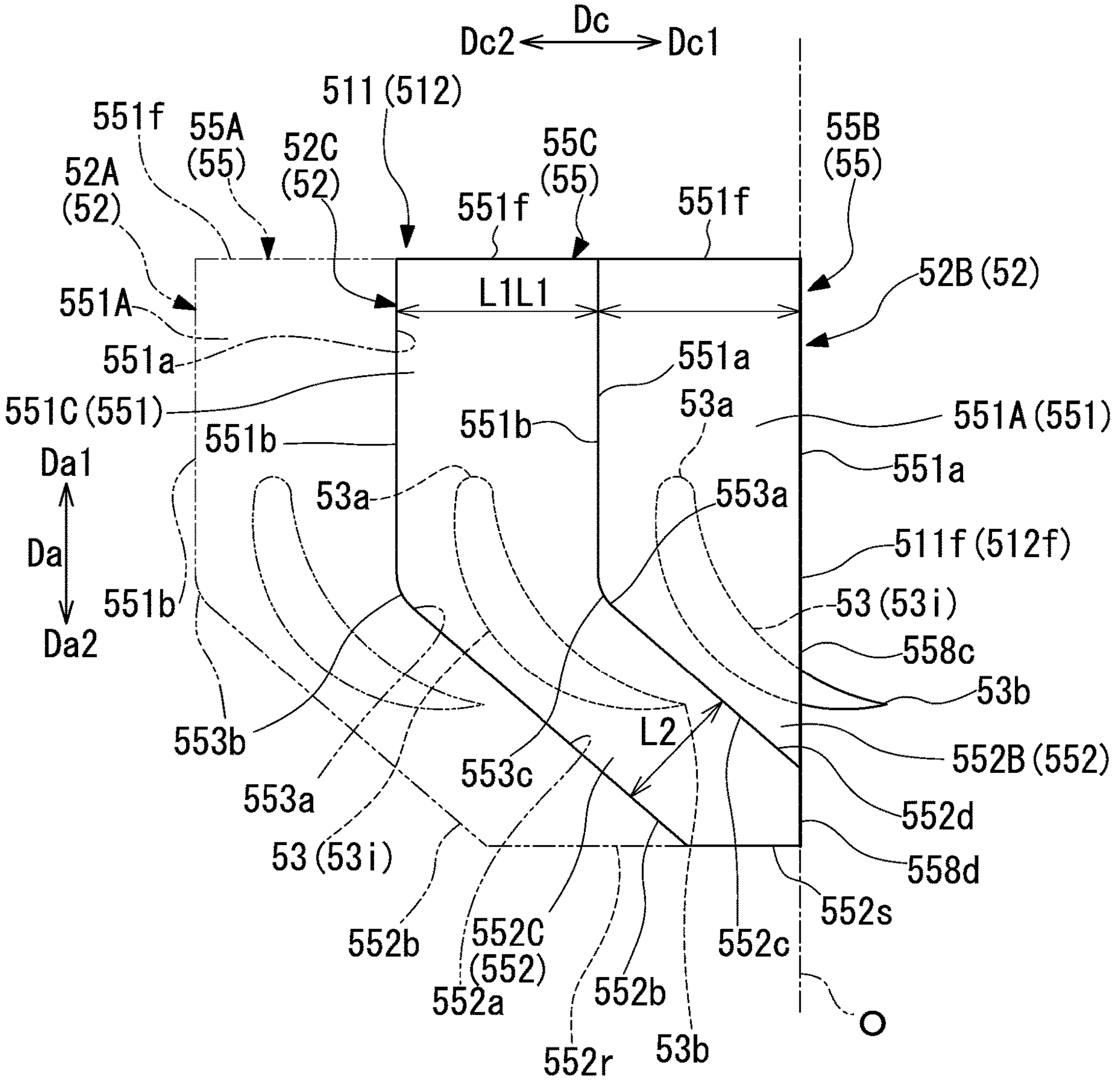
FIG. 8 is a view when each inner platform member of a second nozzle module and a third nozzle module of the plurality of nozzle modules in FIG. 4 is viewed from the inside in the radial direction.

As shown in FIG. 8, the inner platform member 55B of the second nozzle module 52B integrally has a first inner portion 551B formed on the first side Da1 in the axial direction Da and a second inner portion 552B formed on the second side Da2 in the axial direction Da.

The first inner portion 551B is formed in the same shape as the first inner portion 551A of the first nozzle module 52A. That is, the first inner portion 551B has an inner front surface 551*f* and a pair of first inner side surfaces 551*a* and 551*b*, when viewed in the radial direction Dr.

The second inner portion 552B is formed in a shape different from that of the second inner portion 552A of the first nozzle module 52A. The second inner portion 552B is formed to extend integrally with the first inner portion 551B on the second side Da2 in the axial direction Da. The second inner portion 552B has one second inner side surface 552*c* and one third inner side surface (third side surface) 558*c*, when viewed in the radial direction Dr. The second inner portion 552B has only one second inner side surface 552*c* and only one third inner side surface 558*c*, and does not have the inner rear surface 552*r*.

The second inner side surface 552*c* extends obliquely with respect to the first inner side surface 551*b*, when viewed in the radial direction Dr. The second inner side surface 552*c* extends obliquely toward the first side Dc1 in the circumferential direction Dc as the second inner side surface 552*c* is directed from the first inner side surface 551*b* toward the second side Da2 in the axial direction Da. The second inner side surface 552*c* is connected to the first inner side surface 551*b*. The second inner side surface 552*c* intersects with the inner-side inner peripheral surface 55*f*. The second inner side surface 552*c* is orthogonal to (intersects with) the inner-side outer peripheral surface 55*g*. The second inner side surface 552*c* is formed parallel to the second inner side surface 552*b* of the first nozzle module 52A. The second inner side surface 552*c* is formed to be shorter than the second inner side surface 552*b* of the first nozzle module 52A, when viewed in the radial direction Dr.

The third inner side surface 558*c* extends by intersecting with the second inner side surface 552*c*, when viewed in the radial direction Dr. The third inner side surface 558*c* is connected to the second inner side surface 552*c* at an acute angle, when viewed in the radial direction Dr. That is, when viewed in the radial direction Dr, the second inner portion 552B is formed in a substantially triangular shape so that the interval between the second inner side surface 552*c* and the third inner side surface 558*c* gradually decreases toward the second side Da2 in the axial direction Da. The third inner side surface 558*c* is a surface continuous with the first inner side surface 551*a*, and extends parallel to the first inner side surface 551*a* in the axial direction Da. The third inner side surface 558*c* intersects with the inner-side inner peripheral surface 55*f*. The third inner side surface 558*c* is orthogonal to (intersects with) the inner-side outer peripheral surface 55*g*. The third inner side surface 558*c* is disposed on the first side Dc1 in the circumferential direction Dc of the second inner portion 552B, when viewed in the radial direction Dr. In the second nozzle module 52B, the first inner side surface 551*a* and the third inner side surface 558*c* form a portion of the upper half ring split surface 511*f* of the upper half nozzle ring 511 and the lower half ring split surface 512*f* of the lower half nozzle ring 512.

The inner platform member 55B has an inner curved surface 553*c* on the second side Da2 in the circumferential direction Dc, when viewed in the radial direction Dr. The inner curved surface 553*c* is curved and smoothly connected between the first inner side surface 551*b* and the second inner side surface 552*c* on the second side Da2 in the circumferential direction Dc of the inner platform member 55B. The inner curved surface 553*c* is a protruding surface protruding when viewed in the radial direction Dr. The inner curved surface 553*b* is formed in a shape overlapping the inner curved surface 553*a* of the first nozzle module 52A without any gap, when viewed in the radial direction Dr.

The inner platform member 55B of the second nozzle module 52B is connected to a partial region of the inner peripheral end portion 53*i* on the inner side Dri in the radial direction Dr of the nozzle body 53, when viewed in the radial direction Dr. The first inner portion 551B is disposed to overlap the end portion 53*a* of the nozzle body 53 on the first side Da1 in the axial direction Da, when viewed in the radial direction Dr. When viewed in the radial direction Dr, a partial region including the end portion 53*b* of the nozzle body 53 is disposed to protrude from the second inner portion 552B to the first side Dc1 in the circumferential direction Dc. That is, when viewed in the radial direction Dr, the second inner portion 552B overlaps only a partial region of the inner peripheral end portion 53*i*, and does not overlap the end portion 53*b* of the nozzle body 53.

Figure 9:
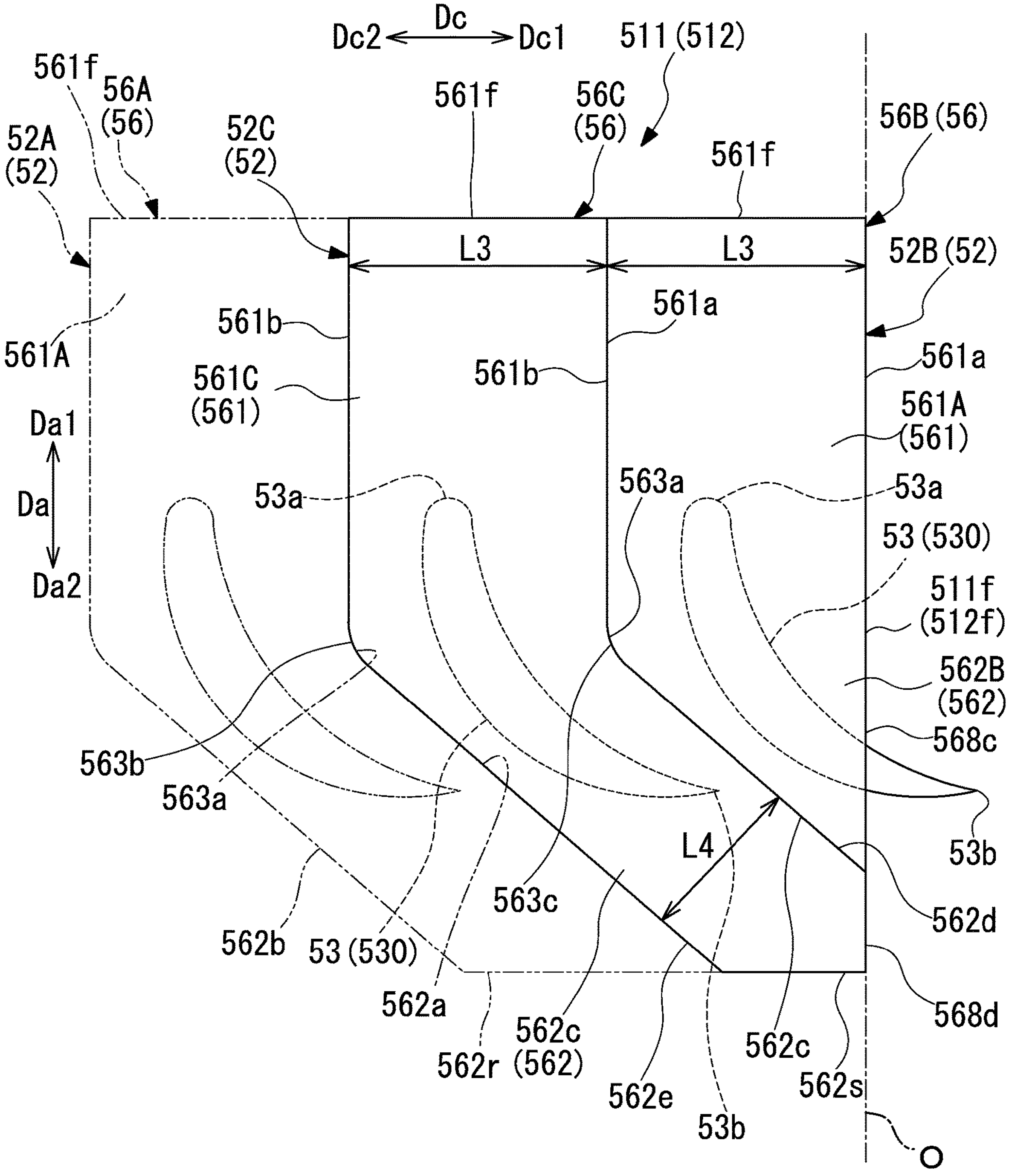
FIG. 9 is a view when each outer platform member of the second nozzle module and the third nozzle module of the plurality of nozzle modules in FIG. 4 is viewed from the outside in the radial direction.

As shown in FIG. 9, the outer platform member 56B of the second nozzle module 52B integrally has a first outer portion 561B formed on the first side Da1 in the axial direction Da, and a second outer portion 562B formed on the second side Da2 in the axial direction Da.

The first outer portion 561B is formed in the same shape as the first outer portion 561A of the first nozzle module 52A. That is, the first outer portion 561B has an outer front surface 561*f* and a pair of first outer side surfaces 561*a* and 561*b*, when viewed in the radial direction Dr.

The second outer portion 562B has a shape different from that of the second outer portion 562A of the first nozzle module 52A. The second outer portion 562B is formed to extend integrally with the first outer portion 561B on the second side Da2 in the axial direction Da. The second outer portion 562B has one second outer side surface 562*c* and one third outer side surface (third side surface) 568*c*, when viewed in the radial direction Dr. The second outer portion 562B has only one second outer side surface 562*c* and only one third outer side surface 568*c*, and does not have the outer rear surface 562*r*.

The second outer side surface 562*c* extends obliquely with respect to the first outer side surface 561*b*, when viewed in the radial direction Dr. The second outer side surface 562*c* extends obliquely toward the first side Dc1 in the circumferential direction Dc as the second outer side surface 562*c* is directed from the first outer side surface 561*b* toward the second side Da2 in the axial direction Da. The second outer side surface 562*c* is connected to the first outer side surface 561*b*. The second outer side surface 562*c* intersects with the outer-side inner peripheral surface 56*f*. The second outer side surface 562*c* is orthogonal to (intersects with) the outer-side outer peripheral surface 56*g*. The second outer side surface 562*c* is formed parallel to the second outer side surface 562*b* of the first nozzle module 52A. The second outer side surface 562*c* is formed to be shorter than the second outer side surface 562*b* of the first nozzle module 52A, when viewed in the radial direction Dr.

The third outer side surface 568*c* extends by intersecting with the second outer side surface 562*c*, when viewed in the radial direction Dr. The third outer side surface 568*c* is connected to the second outer side surface 562*c* at an acute angle, when viewed in the radial direction Dr. That is, when viewed in the radial direction Dr, the second outer portion 562B is formed in a substantially triangular shape so that the interval between the second outer side surface 562*c* and the third outer side surface 568*c* gradually decreases toward the second side Da2 in the axial direction Da. The third outer side surface 568*c* is a surface continuous with the first outer side surface 561*a*, and extends parallel to the first outer side surface 561*a* in the axial direction Da. The third outer side surface 568*c* is disposed on the first side Dc1 in the circumferential direction Dc of the second outer portion 562B, when viewed in the radial direction Dr. The third outer side surface 568*c* intersects with the outer-side inner peripheral surface 56*f*. The third outer side surface 568*c* is orthogonal to (intersects with) the outer-side outer peripheral surface 56*g*. In the second nozzle module 52B, the first outer side surface 561*a* and the third outer side surface 568*c* form a portion of the upper half ring split surface 511*f* of the upper half nozzle ring 511 and the lower half ring split surface 512*f* of the lower half nozzle ring 512.

The outer platform member 56B has an outer curved surface 563*c* on the second side Da2 in the circumferential direction Dc, when viewed in the radial direction Dr. The outer curved surface 563*c* is curved and smoothly connected between the first outer side surface 561*b* and the second outer side surface 562*c* on the second side Da2 in the circumferential direction Dc of the outer platform member 56B. The outer curved surface 563*c* is a protruding surface protruding when viewed in the radial direction Dr.

The outer platform member 56B of the second nozzle module 52B is connected to a partial region of the outer peripheral end portion 53*o* on the outer side Dro of the nozzle body 53 in the radial direction Dr, when viewed in the radial direction Dr. The first outer portion 561B is disposed to overlap the end portion 53*a* of the nozzle body 53 on the first side Da1 in the axial direction Da, when viewed in the radial direction Dr. When viewed in the radial direction Dr, a partial region including the end portion 53*b* of the nozzle body 53 is disposed to protrude from the second outer portion 562B to the first side Dc1 in the circumferential direction Dc. That is, when viewed in the radial direction Dr, the second outer portion 562B overlaps only a partial region of the outer peripheral end portion 53*o*, and does not overlap the end portion 53*b* of the nozzle body 53.

As shown in FIGS. 4 and 5, in the plurality of nozzle modules 52, the third nozzle module 52C is disposed between the second nozzle module 52B disposed in the end portion on the first side Dc1 in the circumferential direction Dc and the first nozzle module 52A, in the upper half nozzle ring 511 and the lower half nozzle ring 512.

As shown in FIG. 8, the inner platform member 55C of the third nozzle module 52C integrally has a first inner portion 551C formed on the first side Da1 in the axial direction Da and a second inner portion 552C formed on the second side Da2 in the axial direction Da.

The first inner portion 551C is formed in the same shape as the first inner portion 551A of the first nozzle module 52A and the first inner portion 551B of the second nozzle module 52B. That is, the first inner portion 551C has an inner front surface 551*f* and a pair of first inner side surfaces 551*a* and 551*b*, when viewed in the radial direction Dr.

The second inner portion 552C is formed in a shape different from that of the second inner portion 552A of the first nozzle module 52A or the second inner portion 552B of the second nozzle module 52B. The second inner portion 552C is formed to extend integrally with the first inner portion 551C on the second side Da2 in the axial direction Da. When viewed in the radial direction Dr, the second inner portion 552C has an inner rear surface 552*s*, a pair of second inner side surfaces 552*d* and 552*b*, and a third inner side surface 558*d*.

The inner rear surface 552*s* extends in the circumferential direction Dc when viewed in the radial direction Dr. The inner rear surface 552*s* is formed to face the second side Da2 in the axial direction Da to be opposite to the inner front surface 551*f*. The inner rear surface 552*s* is formed to be shorter than the inner rear surface 552*r* of the first nozzle module 52A, when viewed in the radial direction Dr. The inner rear surface 552*s* intersects with the inner-side inner peripheral surface 55*f*. The inner rear surface 552*s* is orthogonal to (intersects with) the inner-side outer peripheral surface 55*g*.

The pair of second inner side surfaces 552*d* and 552*b* each extend obliquely with respect to the pair of first inner side surfaces 551*a* and 551*b*, when viewed in the radial direction Dr. The pair of second inner side surfaces 552*d* and 552*b* each are inclined toward the first side Dc1 in the circumferential direction Dc as both are directed from the pair of first inner side surfaces 551*a* and 551*b* toward the second side Da2 in the axial direction Da. The second inner side surface 552*d* is connected to the first inner side surface 551*a*. The pair of second inner side surfaces 552*d* and 552*b* extend parallel to each other, when viewed in the radial direction Dr. The interval between the pair of second inner side surfaces 552*d* and 552*b* is equal to the interval L2 between the pair of second inner side surfaces 552*a* and 552*b* in the first nozzle module 52A. The second inner side surface 552*d* is formed to have the same length as the second inner side surface 552*c* of the second nozzle module 52B, when viewed in the radial direction Dr. The second inner side surface 552*d* intersects with the inner-side inner peripheral surface 55*f*. The second inner side surface 552*d* is orthogonal to (intersects with) the inner-side outer peripheral surface 55*g*.

The third inner side surface 558*d* extends by intersecting with the second inner side surface 552*d*, when viewed in the radial direction Dr. The third inner side surface 558*d* is connected to the second inner side surface 552*d* at an obtuse angle, when viewed in the radial direction Dr. The third inner side surface 558*d* is connected to the inner rear surface 552*s* at a right angle, when viewed in the radial direction Dr. In the third nozzle module 52C, the third inner side surface 558*d* is a surface which is not continuous with the first inner side surfaces 551*a* and 551*b*, and is continuous with the second inner side surface 552*d* and the inner rear surface 552*r*. The third inner side surface 558*d* extends parallel to the first inner side surfaces 551*a* and 551*b* in the axial direction Da. The third inner side surface 558*d* intersects with the inner-side inner peripheral surface 55*f*. The third inner side surface 558*d* is orthogonal to (intersects with) the inner-side outer peripheral surface 55*g*. The third inner side surface 558*d* is disposed on the first side Dc1 in the circumferential direction Dc of the second inner portion 552C, when viewed in the radial direction Dr. The third inner side surface 558*d* is formed to be continuous with the third inner side surface 558*c* of the second nozzle module 52B on the second side Da2 in the axial direction Da. In the second nozzle module 52B, the third inner side surface 558*d* forms a portion of the upper half ring split surface 511*f* of the upper half nozzle ring 511 and the lower half ring split surface 512*f* of the lower half nozzle ring 512.

The inner platform member 55C of the third nozzle module 52C has inner curved surfaces 553*a* and 553*b* on the first side Da1 and the second side Da2 in the circumferential direction Dc, when viewed in the radial direction Dr.

The inner platform member 55C of the third nozzle module 52C is connected to an entire region of the inner peripheral end portion 53*i* on the inner side Dri in the radial direction Dr of the nozzle body 53, when viewed in the radial direction Dr. The first inner portion 551C is disposed to overlap the end portion 53*a* of the nozzle body 53 on the first side Da1 in the axial direction Da, when viewed in the radial direction Dr. The second inner portion 552C is disposed to overlap the end portion 53*b* of the nozzle body 53 on the second side Da2 in the axial direction Da, when viewed in the radial direction Dr.

As shown in FIG. 9, the outer platform member 56C of the third nozzle module 52C integrally has a first outer portion 561C formed on the first side Da1 in the axial direction Da and a second outer portion 562C formed on the second side Da2 in the axial direction Da.

The first outer portion 561C is formed in the same shape as the first outer portion 561A of the first nozzle module 52A and the first outer portion 561B of the second nozzle module 52B. That is, the first outer portion 561C has an outer front surface 561*f* and a pair of first outer side surfaces 561*a* and 561*b*, when viewed in the radial direction Dr.

The second outer portion 562C is formed in a different shape from that of the second outer portion 562A of the first nozzle module 52A or the second outer portion 562B of the second nozzle module 52B. The second outer portion 562C is formed to extend integrally with the first outer portion 561C on the second side Da2 in the axial direction Da. The second outer portion 562C has an outer rear surface 562*s*, a pair of second outer side surfaces 562*a* and 562*b*, and a third outer side surface 568*d*, when viewed in the radial direction Dr.

The outer rear surface 562*s* extends in the circumferential direction Dc when viewed in the radial direction Dr. The outer rear surface 562*s* is formed to face the second side Da2 in the axial direction Da to be opposite to the outer front surface 561*f*. The outer rear surface 562*s* is formed to be shorter than the outer rear surface 562*r* of the first nozzle module 52A, when viewed in the radial direction Dr. The outer rear surface 562*s* intersects with the outer-side inner peripheral surface 56*f*. The outer rear surface 562*s* is orthogonal to (intersects with) the outer-side outer peripheral surface 56*g*.

The pair of second outer side surfaces 562*d* and 562*b* each extend obliquely with respect to the pair of first outer side surfaces 561*a* and 561*b*, when viewed in the radial direction Dr. The pair of second outer side surfaces 562*d* and 562*b* each are inclined toward the first side Dc1 in the circumferential direction Dc as both are directed from the pair of first outer side surfaces 561*a* and 561*b* toward the second side Da2 in the axial direction Da. The second outer side surface 562*d* is connected to the first outer side surface 561*a*. The pair of second outer side surfaces 562*d* and 562*b* extend parallel to each other when viewed in the radial direction Dr. The interval between the pair of second outer side surfaces 562*d* and 562*b* is equal to the interval L2 between the pair of second outer side surfaces 562*a* and 562*b* in the first nozzle module 52A. The second outer side surface 562*d* has the same length as the second outer side surface 562*c* of the second nozzle module 52B, when viewed in the radial direction Dr. The second outer side surface 562*d* intersects with the outer-side inner peripheral surface 56*f*. The second outer side surface 562*d* is orthogonal to (intersects with) the outer-side outer peripheral surface 56*g*.

The third outer side surface 568*d* extends by intersecting with the second outer side surface 562*d*, when viewed in the radial direction Dr. The third outer side surface 568*d* is connected to the second outer side surface 562*d* at an obtuse angle, when viewed in the radial direction Dr. The third outer side surface 568*d* is connected to the outer rear surface 562*s* at a right angle, when viewed in the radial direction Dr. In the third nozzle module 52C, the third outer side surface 568*d* is a surface which is not continuous with the first inner side surfaces 551*a* and 551*b*, and is continuous with the second outer side surface 562*d* and the outer rear surface 562*s*. The third outer side surface 568*d* extends parallel to the first outer side surfaces 561*a* and 561*b* in the axial direction Da. The third outer side surface 568*d* intersects with the outer-side inner peripheral surface 56*f*. The third outer side surface 568*d* is orthogonal to (intersects with) the outer-side outer peripheral surface 56*g*. The third outer side surface 568*d* is disposed on the first side Dc1 in the circumferential direction Dc of the second outer portion 562C, when viewed in the radial direction Dr. The third outer side surface 568*d* is formed to be continuous with the third outer side surface 568*c* of the second nozzle module 52B on the second side Da2 in the axial direction Da. In the second nozzle module 52B, the third outer side surface 568*d* forms a portion of the upper half ring split surface 511*f* of the upper half nozzle ring 511 and the lower half ring split surface 512*f* of the lower half nozzle ring 512.

The outer platform member 56C of the third nozzle module 52C has outer curved surfaces 563*a* and 563*b* on the first side Da1 and the second side Da2 in the circumferential direction Dc, when viewed in the radial direction Dr.

The outer platform member 56C of the third nozzle module 52C is connected to an entire region of the outer peripheral end portion 53*o* on the outer side Dro in the radial direction Dr of the nozzle body 53, when viewed in the radial direction Dr. The first outer portion 561C is disposed to overlap the end portion 53*a* of the nozzle body 53 on the first side Da1 in the axial direction Da, when viewed in the radial direction Dr. The second outer portion 562C is disposed to overlap the end portion 53*b* of the nozzle body 53 on the second side Da2 in the axial direction Da, when viewed in the radial direction Dr.

As shown in FIGS. 4 and 5, the fourth nozzle module 52D in the plurality of nozzle modules 52 is disposed in an end portion on the second side Dc2 in the circumferential direction Dc in the upper half nozzle ring 511 and the lower half nozzle ring 512.

Figure 10:
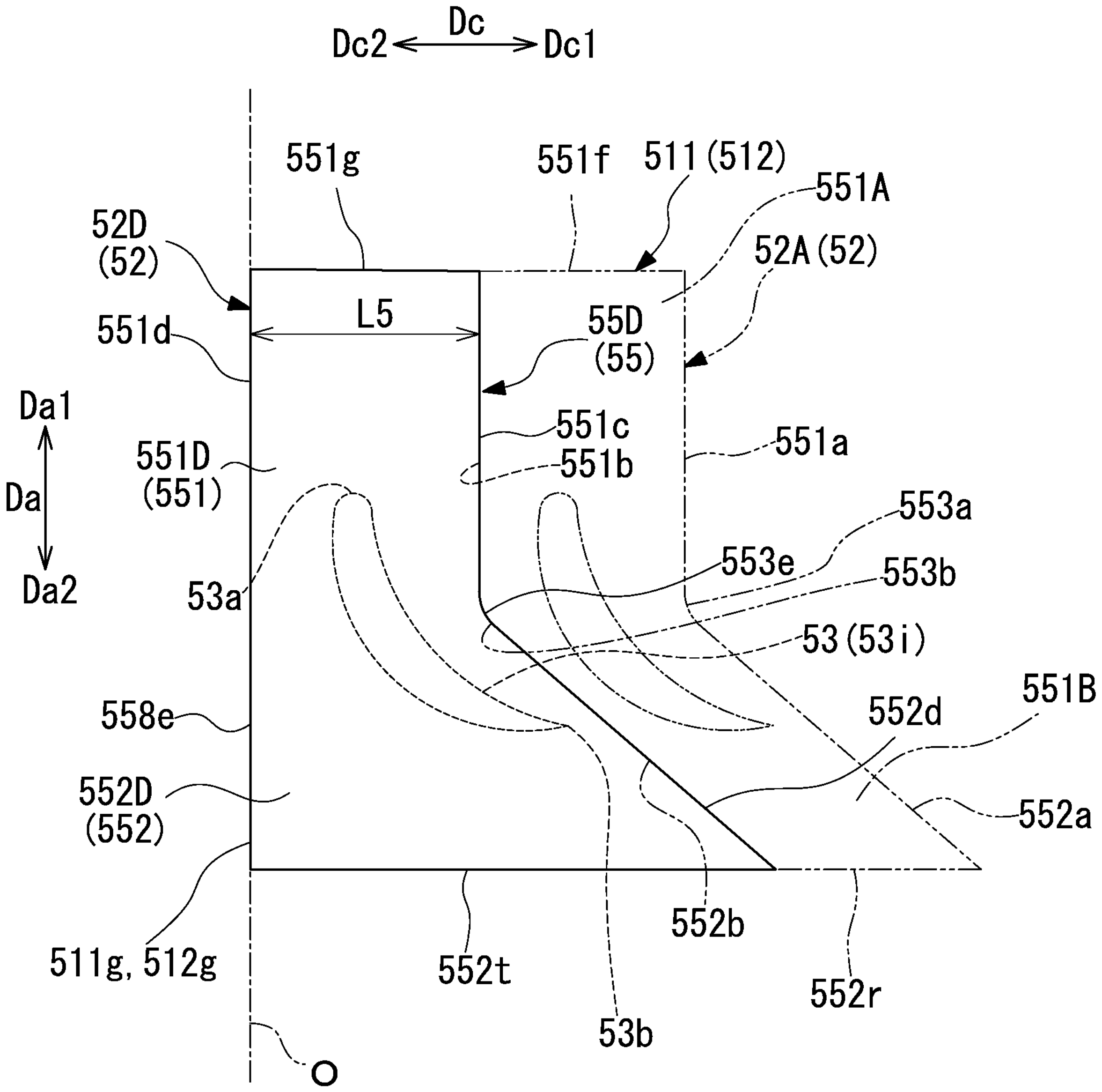
FIG. 10 is a view when an inner platform member of a fourth nozzle module of the plurality of nozzle modules in FIG. 4 is viewed from the inside in the radial direction.

As shown in FIG. 10, the inner platform member 55D of the fourth nozzle module 52D integrally has a first inner portion 551D formed on the first side Da1 in the axial direction Da and a second inner portion 552D formed on the second side Da2 in the axial direction Da.

The first inner portion 551D is formed to have a size (shape) different from that of the first inner portion 551A of the first nozzle module 52A, the first inner portion 551B of the second nozzle module 52B, and the first inner portion 551C of the third nozzle module 52C. The first inner portion 551D has an inner front surface 551*g* and a pair of first inner side surfaces 551*c* and 551*d*, when viewed in the radial direction Dr.

The inner front surface 551*g* extends in the circumferential direction Dc, when viewed in the radial direction Dr. The inner front surface 551*g* is formed to face the first side Da1 in the axial direction Da. The inner front surface 551*g* is formed to be longer than the inner front surface 551*f* of the first nozzle module 52A, when viewed in the radial direction Dr. The inner front surface 551*g* intersects with the inner-side inner peripheral surface 55*f*. The inner front surface 551*g* is orthogonal to (intersects with) the inner-side outer peripheral surface 55*g*.

The pair of first inner side surfaces 551*c* and 551*d* each extend in the axial direction Da to be orthogonal to the inner front surface 551*g*, when viewed in the radial direction Dr. The pair of first inner side surfaces 551*c* and 551*d* extend toward the second side Da2 in the axial direction Da from both ends of the inner front surface 551*g* in the circumferential direction Dc. The pair of first inner side surfaces 551*c* and 551*d* extend parallel to each other, when viewed in the radial direction Dr. The pair of first inner side surfaces 551*c* and 551*d* are surfaces facing opposite directions in the circumferential direction Dc. The first inner side surfaces 551*c* and 551*d* intersect with the inner-side inner peripheral surface 55*f*. The first inner side surfaces 551*c* and 551*d* are orthogonal to (intersect with) the inner-side outer peripheral surface 55*g*. When viewed in the radial direction Dr, an interval L5 between the pair of first inner side surfaces 551*c* and 551*d* is different from the interval L1 between the pair of first inner side surfaces 551*a* and 551*b* of the first nozzle module 52A. In the present embodiment, the interval L5 is larger than the interval L1.

The present disclosure is not limited to a configuration in which the interval L5 is larger than the interval L1, and is appropriately set according to the size of the nozzle ring 51 to be formed. Thus, the interval L5 may be smaller than, or may be the same as the interval L1.

The second inner portion 552D is formed in a shape different from that of the second inner portion 552A of the first nozzle module 52A, the second inner portion 552B of the second nozzle module 52B, and the second inner portion 552C of the third nozzle module 52C. The second inner portion 552D is formed to extend integrally with the first inner portion 551D on the second side Da2 in the axial direction Da. The second inner portion 552D has one second inner side surface 552*d*, one third inner side surface 558*e*, and an inner rear surface 552*t*, when viewed in the radial direction Dr. The second inner portion 552D has only one second inner side surface 552*d* and only one third inner side surface 558*e*.

The inner rear surface 552*t* extends in the circumferential direction Dc when viewed in the radial direction Dr. The inner rear surface 552*t* is formed to face the second side Da2 in the axial direction Da to be opposite to the inner front surface 551*g*. The inner rear surface 552*t* is formed to be longer than the inner rear surface 552*r* of the first nozzle module 52A, when viewed in the radial direction Dr. The inner rear surface 552*t* intersects with the inner-side inner peripheral surface 55*f*. The inner rear surface 552*t* is orthogonal to (intersects with) the inner-side outer peripheral surface 55*g*.

The second inner side surface 552*d* extends obliquely with respect to the first inner side surface 551*c* on the first side Dc1 in the circumferential direction Dc. The second inner side surface 552*d* extends obliquely toward the first side Dc1 in the circumferential direction Dc as the second inner side surface 552*d* is directed from the first inner side surface 551*e* toward the second side Da2 in the axial direction Da. The second inner side surface 552*d* is connected to the first inner side surface 551*c*. The second inner side surface 552*d* is formed parallel to the second inner side surface 552*b* of the first nozzle module 52A. The second inner side surface 552*d* intersects with the inner-side inner peripheral surface 55*f*. The second inner side surface 552*d* is orthogonal to (intersects with) the inner-side outer peripheral surface 55*g*.

The third inner side surface 558*e* extends by intersecting with the second inner side surface 552*d*, when viewed in the radial direction Dr. The third inner side surface 558*e* is connected to the inner rear surface 552*t* at a right angle, when viewed in the radial direction Dr. The third inner side surface 558*e* is a surface continuous with the first inner side surface 551*d*, and extends parallel to the first inner side surface 551*d* in the axial direction Da. The third inner side surface 558*e* intersects with the inner-side inner peripheral surface 55*f*. The third inner side surface 558*e* is orthogonal to (intersects with) the inner-side outer peripheral surface 55*g*. The third inner side surface 558*e* is disposed on the second side Dc2 in the circumferential direction Dc of the second inner portion 552D, when viewed in the radial direction Dr. In this manner, when viewed in the radial direction Dr, the second inner portion 552D is formed in a substantially trapezoidal shape so that the interval between the second inner side surface 552*d* and the third inner side surface 558*e* gradually increases toward the second side Da2 in the axial direction Da. In the fourth nozzle module 52D, the first inner side surface 551*d* and the third inner side surface 558*e* form the upper half ring split surface 511*g* of the upper half nozzle ring 511 and the lower half ring split surface 512*g* of the lower half nozzle ring 512.

The inner platform member 55D has an inner curved surface 553*e* on the first side Dc1 in the circumferential direction Dc, when viewed in the radial direction Dr. The inner curved surface 553*e* is curved and smoothly connected between the first inner side surface 551*c* and the second inner side surface 552*d* on the first side Da1 in the circumferential direction Dc of the inner platform member 55D. The inner curved surface 553*e* is a recessed surface recessed when viewed in the radial direction Dr. The inner curved surface 553*e* is preferably formed into a shape which comes into contact with the inner curved surface 553*b* of the first nozzle module 52A without any gap.

The inner platform member 55D of the fourth nozzle module 52D is connected to an entire region of the inner peripheral end portion 53*i* on the inner side Dri in the radial direction Dr of the nozzle body 53, when viewed in the radial direction Dr. The first inner portion 551D is disposed to overlap the end portion 53*a* of the nozzle body 53 on the first side Da1 in the axial direction Da, when viewed in the radial direction Dr. The second inner portion 552D is disposed to overlap the end portion 53*b* of the nozzle body 53 on the second side Da2 in the axial direction Da, when viewed in the radial direction Dr.

Figure 11:
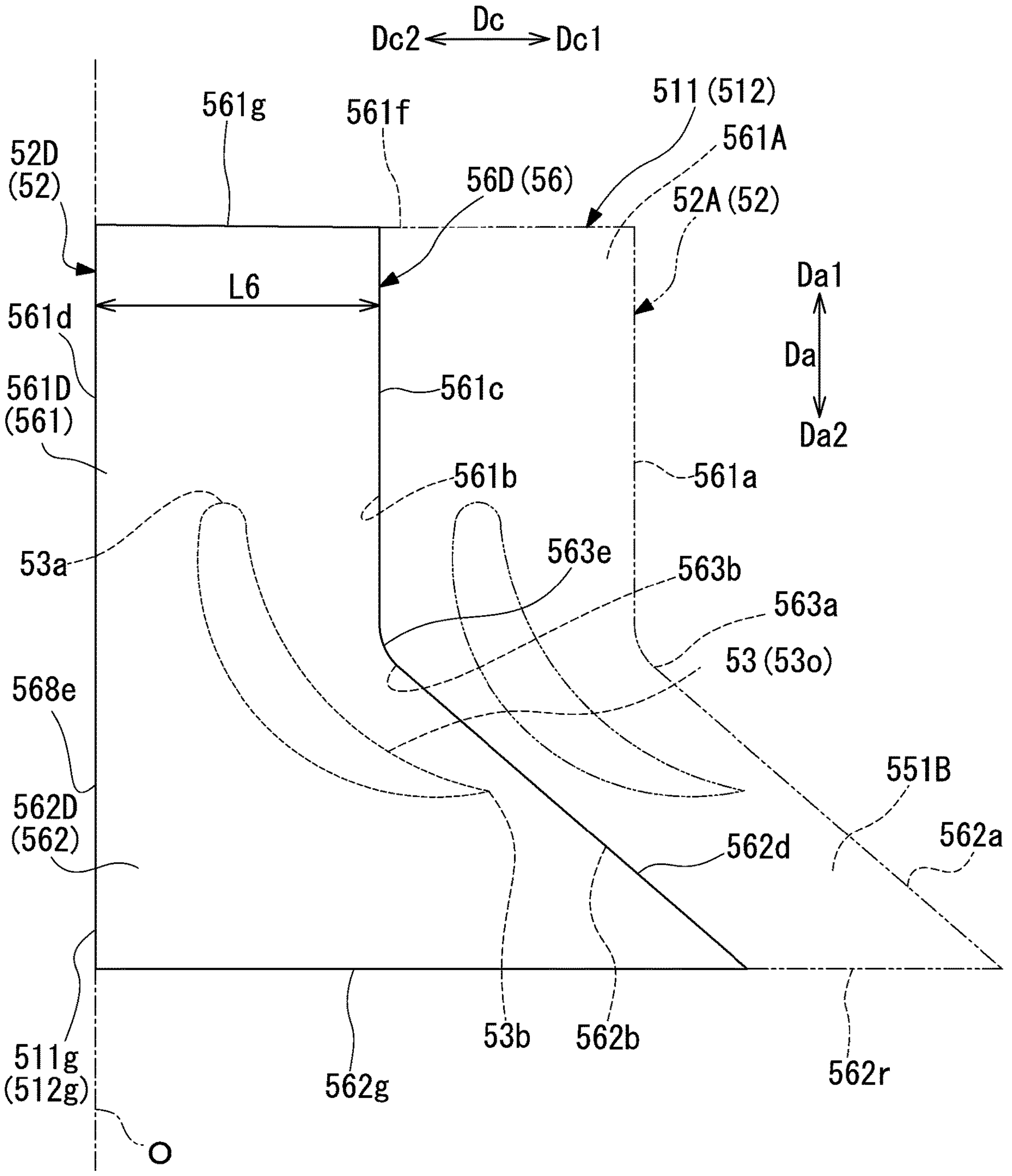
FIG. 11 is a view when an outer platform member of the fourth nozzle module of the plurality of nozzle modules in FIG. 4 is viewed from the outside in the radial direction.

As shown in FIG. 11, the outer platform member 56D of the fourth nozzle module 52D integrally has a first outer portion 561D formed on the first side Da1 in the axial direction Da and a second outer portion 562D formed on the second side Da2 in the axial direction Da.

The first outer portion 561D is formed to have a size (shape) different from those of the first outer portion 561A of the first nozzle module 52A, the first outer portion 561B of the second nozzle module 52B, and the first outer portion 561C of the third nozzle module 52C. The first outer portion 561D has an outer front surface 561*g* and a pair of first outer side surfaces 561*c* and 561*d*, when viewed in the radial direction Dr.

The outer front surface 561*g* extends in the circumferential direction Dc when viewed in the radial direction Dr. The outer front surface 561*g* is formed to face the first side Da1 in the axial direction Da. The outer front surface 561*g* is formed to be longer than the outer front surface 561*f* of the first nozzle module 52A, when viewed in the radial direction Dr. The outer front surface 561*g* intersects with the outer-side inner peripheral surface 56*f*. The outer front surface 561*g* is orthogonal to (intersects with) the outer-side outer peripheral surface 56*g*.

The pair of first outer side surfaces 561*c* and 561*d* each extend in the axial direction Da to be orthogonal to the outer front surface 561*g*, when viewed in the radial direction Dr. The pair of first outer side surfaces 561*c* and 561*d* extend toward the second side Da2 in the axial direction Da from both ends of the outer front surface 561*g* in the circumferential direction Dc. The pair of first outer side surfaces 561*c* and 561*d* extend parallel to each other, when viewed in the radial direction Dr. The pair of first outer side surfaces 561*c* and 561*d* are surfaces facing opposite directions in the circumferential direction Dc. The first outer side surfaces 561*c* and 561*d* intersect with the outer-side inner peripheral surface 56*f*. The first outer side surfaces 561*c* and 561*d* are orthogonal to (intersect with) the outer-side outer peripheral surface 56*g*. When viewed in the radial direction Dr, an interval L6 between the pair of first outer side surfaces 561*c* and 561*d* is different from the interval L3 between the pair of first outer side surfaces 561*a* and 561*b* of the first nozzle module 52A. In the present embodiment, the interval L6 is larger than the interval L3.

The present disclosure is not limited to a configuration in which the interval L6 is larger than the interval L3, and is appropriately set according to the size of the nozzle ring 51 to be formed. Therefore, the interval L6 may be smaller than, or may be the same as the interval L3.

The second outer portion 562D is formed in a shape different from those of the second outer portion 562A of the first nozzle module 52A, the second outer portion 562B of the second nozzle module 52B, and the second outer portion 562C of the third nozzle module 52C. The second outer portion 562D is formed to extend integrally with the first outer portion 561D to the second side Da2 in the axial direction Da. The second outer portion 562D has one second outer side surface 562*d*, one third outer side surface 568*e*, and an outer rear surface 562*t*, when viewed in the radial direction Dr. The second outer portion 562D has only one second outer side surface 562*d* and only one third outer side surface 568*e*.

The outer rear surface 562*t* extends in the circumferential direction Dc when viewed in the radial direction Dr. The outer rear surface 562*t* is formed to face the second side Da2 in the axial direction Da to be opposite to the outer front surface 561*g*. The outer rear surface 562*t* is formed to be longer than the outer rear surface 562*r* of the first nozzle module 52A, when viewed in the radial direction Dr. The outer rear surface 562*t* intersects with the outer-side inner peripheral surface 56*f*. The outer rear surface 562*t* is orthogonal to (intersects with) the outer-side outer peripheral surface 56*g*.

The second outer side surface 562*d* extends obliquely with respect to the first outer side surface 561*c* of the first side Dc1 in the circumferential direction Dc. The second outer side surface 562*d* extends obliquely toward the first side Dc1 in the circumferential direction Dc as the second outer side surface 562*d* is directed from the first outer side surface 561*c* toward the second side Da2 in the axial direction Da. The second outer side surface 562*d* is connected to the first outer side surface 561*c*. The second outer side surface 562*d* is formed parallel to the second outer side surface 562*b* of the first nozzle module 52A. The second outer side surface 562*d* intersects with the outer-side inner peripheral surface 56*f*. The second outer side surface 562*d* is orthogonal to (intersects with) the outer-side outer peripheral surface 56*g*.

The third outer side surface 568*e* extends by intersecting with the second outer side surface 562*d*, when viewed in the radial direction Dr. The third outer side surface 568*e* is connected to the outer rear surface 562*t* at a right angle, when viewed in the radial direction Dr. The third outer side surface 568*e* is a surface continuous with the first outer side surface 561*d*, and extends parallel to the first outer side surface 561*d* in the axial direction Da. The third outer side surface 568*e* intersects with the outer-side inner peripheral surface 56*f*. The second outer side surface 562*d* is orthogonal to (intersects with) the third outer side surface 568*e*. The third outer side surface 568*e* is disposed on the second side Dc2 in the circumferential direction Dc in the second outer portion 562D, when viewed in the radial direction Dr. In this manner, when viewed in the radial direction Dr, the second outer portion 562D is formed in a substantially trapezoidal shape so that the interval between the second outer side surface 562*d* and the third outer side surface 568*e* gradually increases toward the second side Da2 in the axial direction Da. In the fourth nozzle module 52D, the first outer side surface 561*d* and the third outer side surface 568*e* form the upper half ring split surface 511*g* of the upper half nozzle ring 511 and the lower half ring split surface 512*g* of the lower half nozzle ring 512.

The outer platform member 56D has an outer curved surface 563*e* on the first side Dc1 in the circumferential direction Dc, when viewed in the radial direction Dr. The outer curved surface 563*e* is curved and smoothly connected between the first outer side surface 561*c* and the second outer side surface 562*d* on the first side Da1 in the circumferential direction Dc of the outer platform member 56D. The outer curved surface 563*e* is a recessed surface recessed when viewed in the radial direction Dr. The outer curved surface 563*e* is preferably formed in a shape which comes into contact with the outer curved surface 563*b* of the first nozzle module 52A without any gap.

The outer platform member 56D of the fourth nozzle module 52D is connected to an entire region of the outer peripheral end portion 53*o* on the inner side Dri of the nozzle body 53 in the radial direction Dr, when viewed in the radial direction Dr. The first outer portion 561D is disposed to overlap the end portion 53*a* of the nozzle body 53 on the first side Da1 in the axial direction Da, when viewed in the radial direction Dr. The second outer portion 562D is disposed to overlap the end portion 53*b* of the nozzle body 53 on the second side Da2 in the axial direction Da, when viewed in the radial direction Dr.

(Method for Assembling Nozzle Diaphragm)

Figure 12:
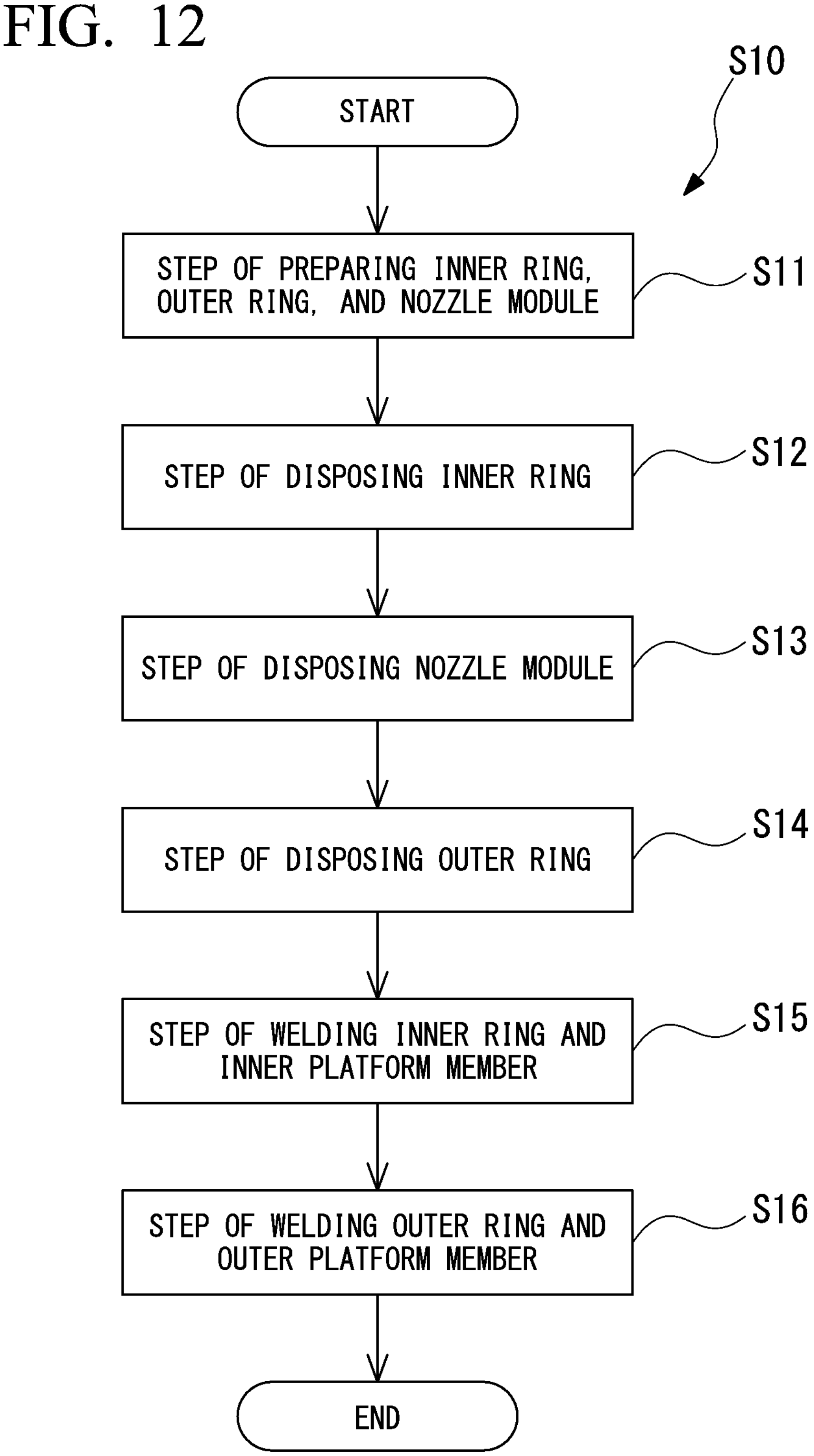
FIG. 12 is a flowchart showing a procedure of a method for assembling a nozzle diaphragm according to an embodiment of the present disclosure.

As shown in FIG. 12, a method S10 for assembling the nozzle diaphragm 5 according to the embodiment of the present disclosure includes Step S11 of preparing the inner ring 6, the outer ring 7, and the nozzle module 52, Step S12 of disposing the inner ring 6, Step S13 of disposing the nozzle module 52, Step S14 of disposing the outer ring 7, Step S15 of welding the inner ring 6 and the inner platform member 55, and Step S16 of welding the outer ring 7 and the outer platform member 56.

In Step S11 of preparing the inner ring 6, the outer ring 7, and the nozzle modules 52, each of the inner ring 6, the outer ring 7, and the plurality of nozzle modules 52 is prepared. For the inner ring 6, the upper half inner ring member 61 and the lower half inner ring member 62 which form the inner ring 6 each are manufactured into predetermined shapes. For the outer ring 7, the upper half outer ring member 71 and the lower half outer ring member 72 which form the outer ring 7 each are manufactured into predetermined shapes. In addition, as the plurality of nozzle modules 52, a plurality of types of the nozzle modules 52 having different configurations of the platform members 54 are manufactured. In the present embodiment, as the nozzle modules 52, the plurality of first nozzle modules 52A, second nozzle modules 52B, third nozzle modules 52C, and fourth nozzle modules 52D are prepared. The first nozzle module 52A, the second nozzle module 52B, the third nozzle module 52C, and the fourth nozzle module 52D each are manufactured as one member from a predetermined metal material through a cutting process by using a processing machine. Here, one member does not indicate a member that joins a plurality of components by welding, and is a member formed as one component without a joint surface by shaving a material.

Figure 13:
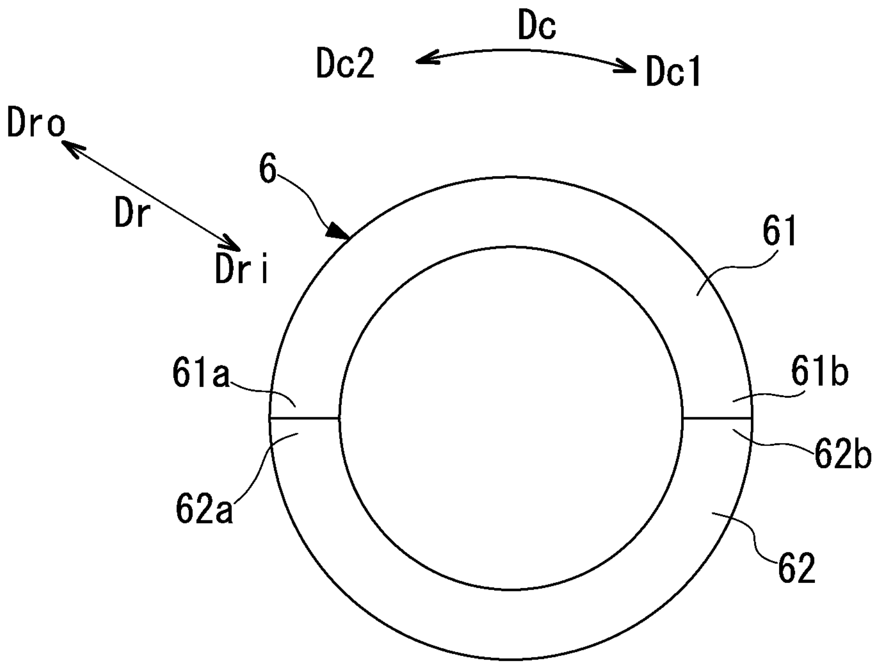
FIG. 13 is a view showing a step of disposing an inner ring in the method for assembling the nozzle diaphragm according to the embodiment of the present disclosure.

In Step S12 of disposing the inner ring 6, as shown in FIG. 13, first, the upper half inner ring member 61 and the lower half inner ring member 62 are vertically combined to assemble the inner ring 6 having an annular shape. Both end portions 61*a* and 61*b* of the upper half inner ring member 61 in the circumferential direction Dc and both end portions 62*a* and 62*b* of the lower half inner ring member 62 in the circumferential direction Dc are connected by a connecting member such as a bolt. The assembled inner ring 6 is disposed at a predetermined location where the nozzle diaphragm 5 is assembled. The inner ring 6 may be supported by a frame (not shown), when necessary.

Figure 14:
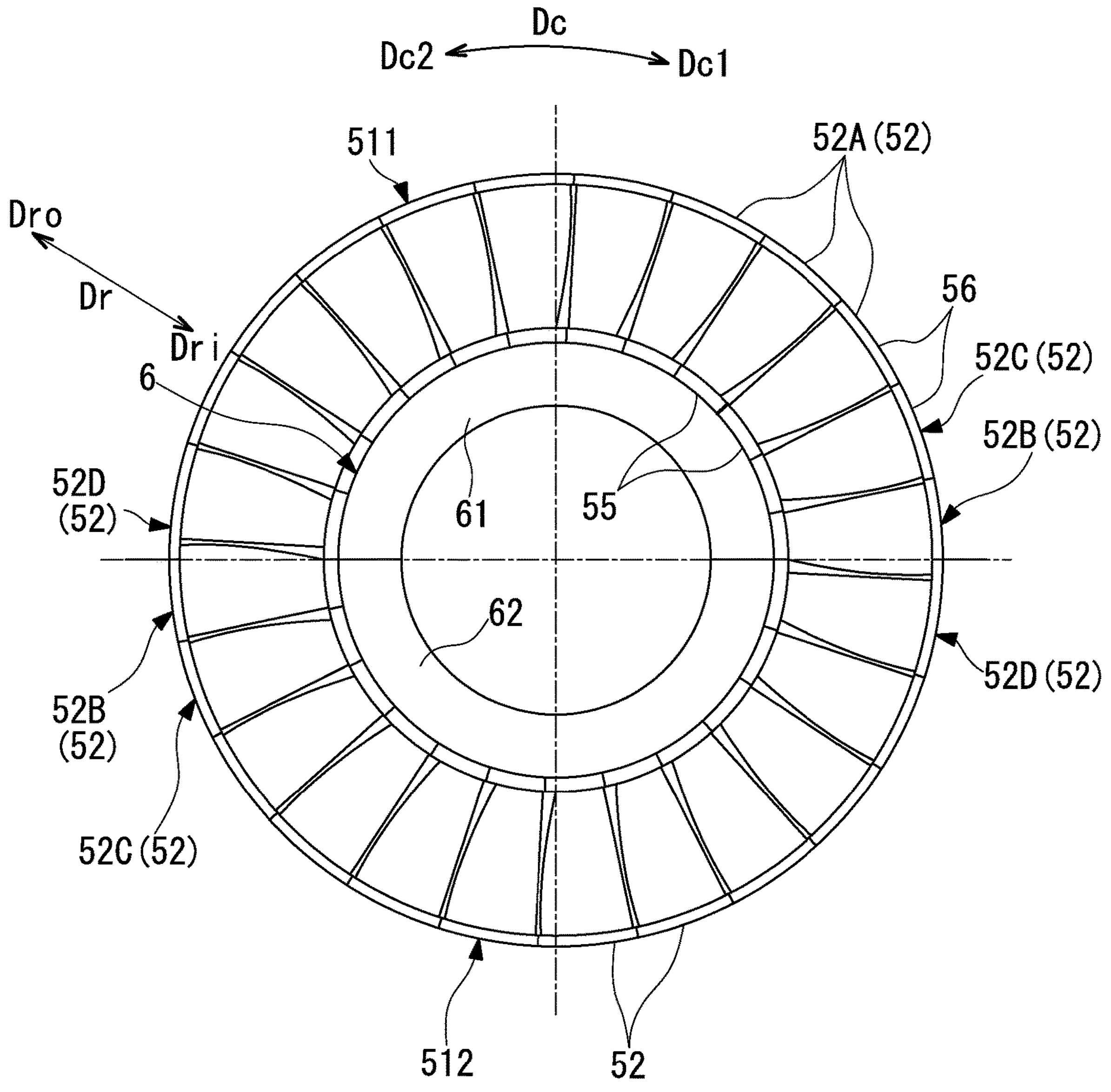
FIG. 14 is a view showing a step of disposing a nozzle module in the method for assembling the nozzle diaphragm according to the embodiment of the present disclosure.

In Step S13 of disposing the nozzle modules 52, as shown in FIG. 14, the plurality of nozzle modules 52 are disposed on the outer side Dro of the inner ring 6 in the radial direction Dr. Each of the nozzle modules 52 is disposed in a state where the inner platform member 55 is disposed along the outer peripheral surface of the inner ring 6. The nozzle modules 52 adjacent to each other in the circumferential direction Dc are disposed in a state where the inner platform members 55 and the outer platform members 56 are adjacent to each other. A predetermined number of the first nozzle modules 52A each are aligned in the circumferential direction Dc on the outer side Dro of the upper half inner ring member 61 and the lower half inner ring member 62 in the radial direction Dr. The second nozzle module 52B and the third nozzle module 52C are disposed in an end portion on the first side Dc1 in the circumferential direction Dc. The fourth nozzle module 52D is disposed in an end portion on the second side Dc2 in the circumferential direction Dc. In this manner, the plurality of nozzle modules 52 are aligned over an entire periphery in the circumferential direction Dc, thereby forming the upper half nozzle ring 511 and the lower half nozzle ring 512.

In Step S13, in the inner platform members 55 adjacent to each other in the circumferential direction Dc, on the first side Da1 in the axial direction Da, the first inner portions 551A, the first inner portion 551A and the first inner portion 551C, the first inner portion 551B and the first inner portion 551C, and the first inner portion 551A and the first inner portion 551D come into contact each other in the circumferential direction Dc. Furthermore, on the second side Da2 in the axial direction Da, the second inner portions 552A, the second inner portion 552A and the second inner portion 552C, the second inner portion 552B and the second inner portion 552C, the second inner portion 552A and the second inner portion 552D come into contact with each other in the circumferential direction Dc. Similarly, in the outer platform members 56 adjacent to each other in the circumferential direction Dc, on the first side Da1 in the axial direction Da, the first outer portions 561A, the first outer portion 561A and the first outer portion 561C, the first outer portion 561B and the first outer portion 561C, and the first outer portion 561A and the first outer portion 561D come into contact with each other in the circumferential direction Dc. Furthermore, on the second side Da2 in the axial direction Da, the second outer portions 562A, the second outer portion 562A and the second outer portion 562C, the second outer portion 562B and the second outer portion 562C, and the second outer portion 562A and the second outer portion 562D come into contact with each other in the circumferential direction Dc. In this case, the first side surface and the second side surface which are side surfaces of the inner platform member 55 and the outer platform member 56 in the circumferential direction Dc are brought into contact with each other. In this manner, the inner platform members 55 adjacent to each other in the circumferential direction Dc are disposed in a state where relative positional deviation in the axial direction Da is prevented.

Figure 15:
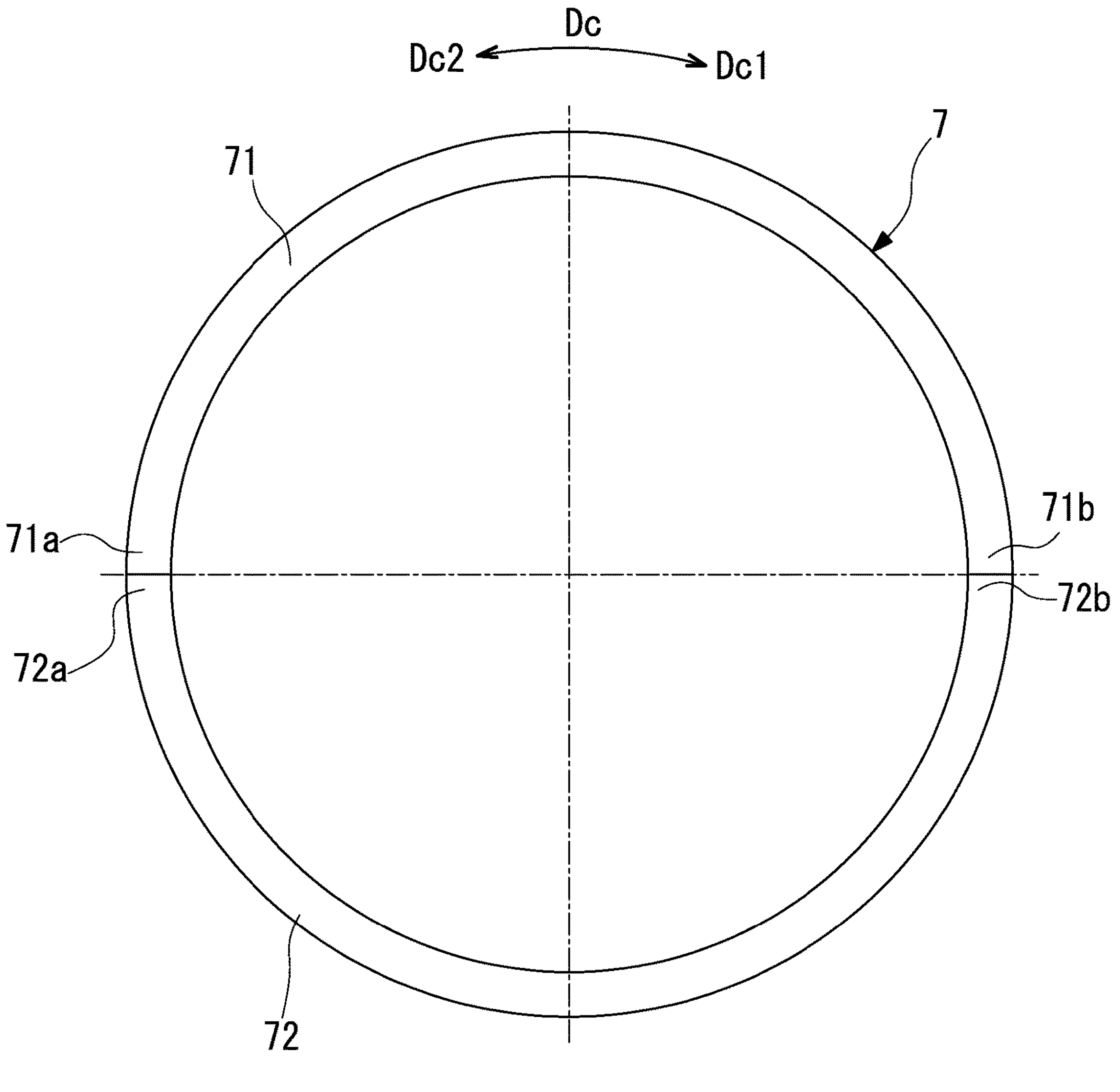
FIG. 15 is a view showing a step of disposing an outer ring in the method for assembling the nozzle diaphragm according to the embodiment of the present disclosure.

In Step S14 of disposing the outer ring 7, as shown in FIG. 15, the upper half outer ring member 71 and the lower half outer ring member 72 are vertically combined to assemble the outer ring 7 having an annular shape. Both end portions 71*a* and 71*b* of the upper half outer ring member 71 in the circumferential direction Dc and both end portions 72*a* and 72*b* of the lower half outer ring member 72 in the circumferential direction Dc are connected by a connecting member such as a bolt. Thereafter, as shown in FIG. 2, the assembled outer ring 7 is disposed on the outer side Dro in the radial direction Dr with respect to the plurality of nozzle modules 52 aligned on the outer side in the radial direction Dr with respect to the inner ring 6.

In Step S15 of welding the inner ring 6 and the inner platform member 55, the outer peripheral surface of the inner ring 6 and the inner platform member 55 of each of the nozzle modules 52 are joined by electron beam welding (EBW), for example. In this manner, an inner welding portion 58 is formed between the inner ring 6 and the inner-side inner peripheral surface 55*f* of the inner platform member 55. Here, Step S15 may be performed after Step S14 of disposing the outer ring 7 is completed. However, prior to Step S14 of disposing the outer ring 7, Step S15 may be performed in a stage where the plurality of nozzle modules 52 are disposed on the outer side Dro of the inner ring 6 in the radial direction Dr. Furthermore, each of the nozzle modules 52 may be sequentially welded to the inner ring 6, each time one of the nozzle modules 52 is disposed on the outer side Dro of the inner ring 6 in the radial direction Dr.

In Step S16 of welding the outer ring 7 and the outer platform member 56, the inner peripheral surface of the outer ring 7 and the outer-side outer peripheral surface 56*g* of the outer platform member 56 of each of the nozzle modules 52 are joined by electron beam welding (EBW), for example. In this manner, the outer welding portion 59 is formed between the outer ring 7 and the outer-side inner peripheral surface 56*f* of the outer platform member 56 in the outer ring 7 and each of the plurality of nozzle modules 52 aligned in the circumferential direction Dc. In this way, the nozzle diaphragm 5 is completely assembled.

In the above-described configuration, the plurality of nozzle modules 52 are disposed on the outer side Dro in the radial direction Dr of the inner ring 6 having an annular shape, and the outer ring 7 having an annular shape is disposed on the outer side Dro in the radial direction Dr. However, the present disclosure is not limited to this method. For example, after the plurality of nozzle modules 52 are joined to the outer side Dro of the upper half inner ring member 61 in the radial direction Dr, the upper half outer ring member 71 may be joined to the outer side Dro in the radial direction Dr. In addition, after the plurality of nozzle modules 52 are joined to the outer side Dro of the lower half inner ring member 62 in the radial direction Dr, the lower half outer ring member 72 may be joined to the outer side Dro in the radial direction Dr. Thereafter, the upper half inner ring member 61 and the lower half inner ring member 62, and the upper half outer ring member 71 and the lower half outer ring member 72 are connected. In this manner, the nozzle diaphragm 5 having an annular shape can be formed.

(Method for Assembling Steam Turbine)

Figure 16:
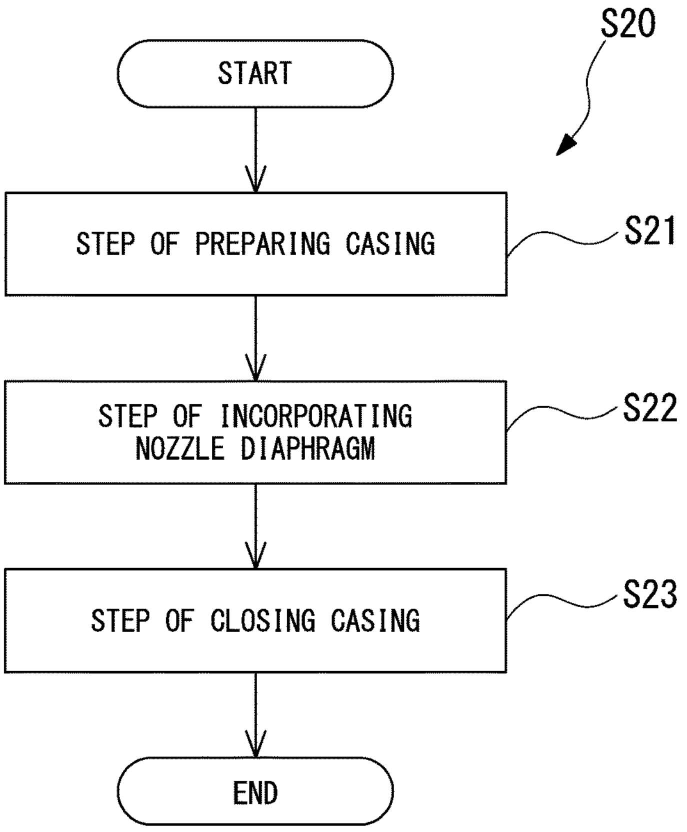
FIG. 16 is a flowchart showing a procedure of a method for assembling a steam turbine according to an embodiment of the present disclosure.

Next, a method S20 for assembling the steam turbine 1 by using the nozzle diaphragm 5 configured as described above will be described. As shown in FIG. 16, the method S20 for assembling the steam turbine 1 according to the embodiment of the present disclosure includes Step S21 of preparing the casing 2, Step S22 of incorporating the nozzle diaphragm 5, and Step S23 of closing the casing 2.

Figure 17:
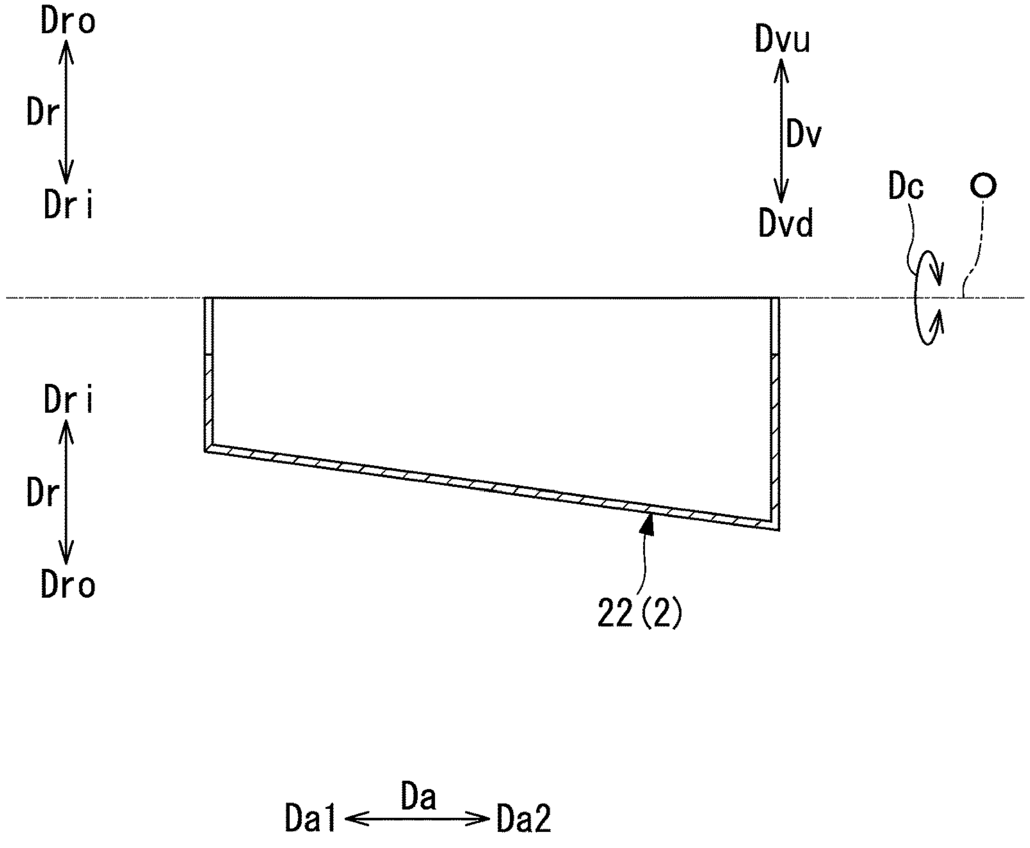
FIG. 17 is a view showing a step of preparing a casing in the method for assembling the steam turbine, and a step of removing the nozzle diaphragm in a method for disassembling the steam turbine according to the embodiment of the present disclosure.

In Step S21 of preparing the casing 2, the upper half casing 21 and the lower half casing 22 which form the casing 2 are manufactured into a predetermined shape. As shown in FIG. 17, the lower half casing 22 is disposed at an installation location of the steam turbine 1 via a support leg (not shown). When the steam turbine 1 is assembled during maintenance of the already installed steam turbine 1, it is not necessary to newly install the lower half casing 22. In addition, the upper half casing 21 is not placed on the lower half casing 22, and the lower half casing 22 is brought into a state of being opened upward Dvu in the vertical direction Dv.

Figure 18:
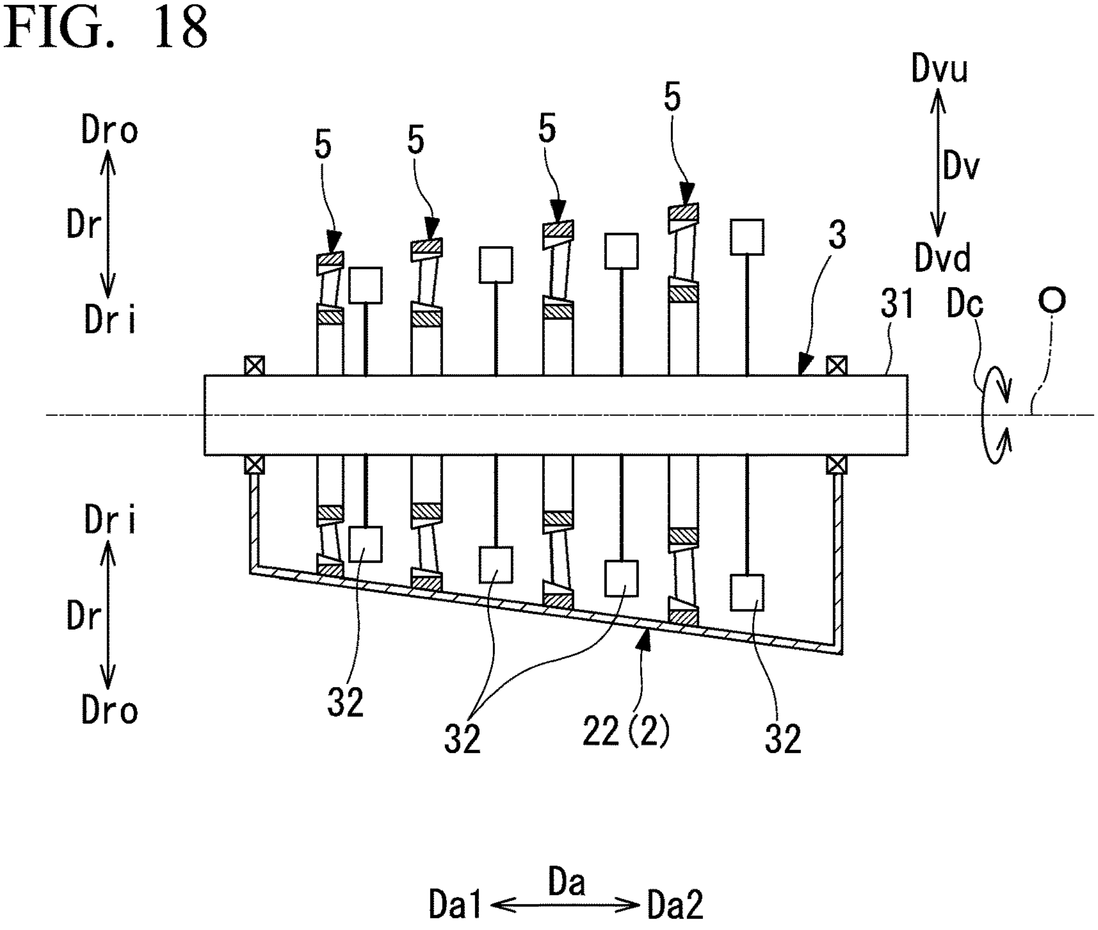
FIG. 18 is a view showing a step of incorporating the nozzle diaphragm in the method for assembling the steam turbine, and a step of opening a part of the casing in the method for disassembling the steam turbine according to the embodiment of the present disclosure.

In Step S22 of incorporating the nozzle diaphragm 5, as shown in FIG. 18, the rotor 3 and the nozzle diaphragm 5 are incorporated into the casing 2. In the embodiment of the present disclosure, the nozzle diaphragm 5 having an annular shape and assembled by using the method S10 for assembling the nozzle diaphragm 5 in advance is incorporated into the casing 2. Here, a specific procedure for incorporating the rotor 3 and the nozzle diaphragm 5 is not limited at all.

In Step S23 of closing the casing 2, the casing 2 into which the rotor 3 and the nozzle diaphragm 5 are incorporated is closed. In the embodiment of the present disclosure, the upper half casing 21 is placed on the lower half casing 22, and the lower half casing 22 and the upper half casing 21 are fixed by a fastening member such as a bolt (not shown) in a state where the upper half casing split surface and the lower half casing split surface are in contact with each other. In this manner, the casing 2 is closed, and the steam turbine 1 is completely assembled as shown in FIG. 1.

(Method for Disassembling Steam Turbine)

Figure 19:
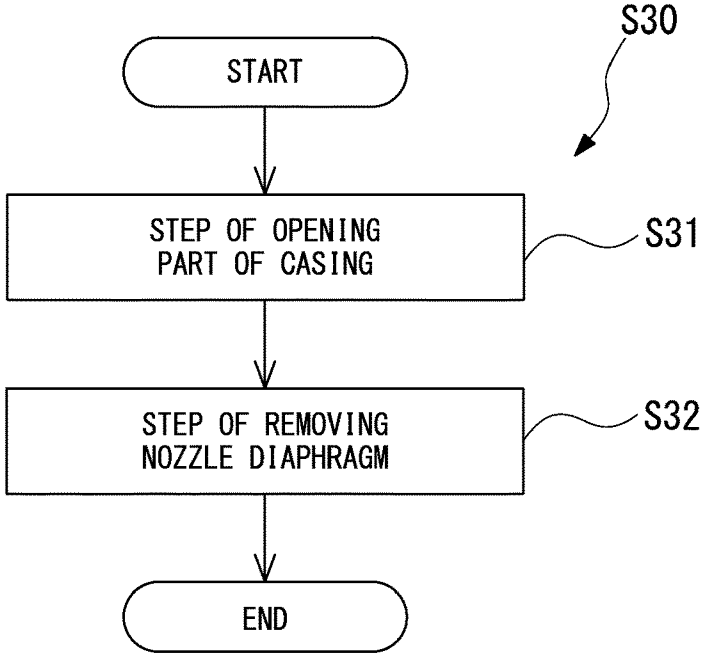
FIG. 19 is a flowchart showing a procedure of the method for disassembling the steam turbine according to the embodiment of the present disclosure.

Next, a method S30 for disassembling the steam turbine 1 by using the nozzle diaphragm 5 configured as described above will be described. As shown in FIG. 19, the method S30 for disassembling the steam turbine 1 according to the embodiment of the present disclosure includes Step S31 of opening a part of the casing 2 and Step S32 of removing the nozzle diaphragm 5.

In Step S31 of opening a part of the casing 2, the part of the casing 2 is opened to remove the nozzle diaphragm 5. For this purpose, a fastening member is removed from a portion where the upper half casing split surface and the lower half casing split surface are in contact with each other, and the lower half casing 22 and the upper half casing 21 are disconnected from each other. Thereafter, the upper half casing 21 is removed. In this manner, as shown in FIG. 18, the lower half casing 22 is brought into a state of being opened upward Dvu in the vertical direction Dv.

In Step S32 of removing the nozzle diaphragm 5, the rotor 3 and the nozzle diaphragm 5 are removed from the casing 2. In the embodiment of the present disclosure, the rotor 3 and the nozzle diaphragm 5 are removed upward from the lower half casing 22. Here, a specific procedure for removing the rotor 3 and the nozzle diaphragm 5 is not limited at all. In this manner, as shown in FIG. 19, only the lower half casing 22 remains in a state of being opened upward Dvu in the vertical direction Dv.

In this way, the steam turbine 1 is completely disassembled. Thereafter, the casing 2, the rotor 3, and the nozzle diaphragm 5 are subjected to maintenance when necessary. As the nozzle diaphragm 5, the used nozzle diaphragm 5 may be replaced with the new nozzle diaphragm 5. In this case, after the steam turbine 1 is disassembled, the new nozzle diaphragm 5 is incorporated into the steam turbine 1 by using the method S20 for assembling the steam turbine 1.

(Operational Effect)

The plurality of the nozzle modules 52 configured as described above are aligned between the inner ring 6 and the outer ring 7 in the circumferential direction Dc, thereby forming the nozzle ring 51. The platform member 54 of each of the nozzle modules 52 has the first inner portion 551 and the first outer portion 561 which are the first portions, and the second inner portion 552 and the second outer portion 562 which are the second portions. The first inner portion 551 has the pair of first inner side surfaces 551*a*, 551*b*, 551*c*, and 551*d* extending in the axial direction Da. In contrast, the second inner portion 552 has the second inner side surfaces 552*a*, 552*b*, 552*c*, and 552*d*. Similarly, the first outer portion 561 has the pair of first outer side surfaces 561*a*, 561*b*, 561*c*, and 561*d* extending in the axial direction Da. In contrast, the second outer portion 562 has the second outer side surfaces 562*a*, 562*b*, 562*c*, and 562*d*. As a result, the second inner portion 552 and the second outer portion 562 extend obliquely with respect to the first inner portion 551 and the first outer portion 561, when viewed in the radial direction Dr. Since the first inner portions 551 and the second inner portions 552, or the first outer portions 561 and the second outer portions 562 are combined, the relative positional deviation between the nozzle modules 52 in the axial direction Da can be prevented. As a result, the plurality of nozzle modules 52 can be highly accurately and reliably assembled while the positional deviation is prevented. In addition, the first inner side surfaces 551*a*, 551*b*, 551*c*, and 551*d* and the first outer side surfaces 561*a*, 561*b*, 561*c*, and 561*d* extend parallel to the central axis O. Therefore, when the plurality of nozzle modules 52 are aligned, the highly accurate nozzle ring 51 can be easily formed simply by aligning the first inner portion 551 and the first outer portion 561. In this manner, it is possible to easily and reliably obtain the nozzle module 52 which enables the highly accurate nozzle ring 51 to be manufactured.

In addition, in the first nozzle module 52A, the third nozzle module 52C, and the fourth nozzle module 52D, the first inner portion 551 and the first outer portion 561 are disposed to overlap the end portion 53*a* of the nozzle body 53 on the first side Da1 in the axial direction Da, when viewed in the radial direction Dr. Furthermore, the second inner portion 552 and the second outer portion 562 are disposed to overlap the end portion 53*b* of the nozzle body 53 on the second side Da2 in the axial direction Da, when viewed in the radial direction Dr. In this manner, the platform member 54 can be formed in a shape corresponding to a shape of the nozzle body 53 having a blade shape. As a result, the platform member 54 having the first portion and the second portion can be formed to have a minimum size while the nozzle body 53 is stably supported.

In addition, in the first nozzle module 52A, the interval L1 between the pair of first inner side surfaces 551*a* and 551*b* in the first inner portion 551A and the interval L2 between the pair of second inner side surfaces 552*a* and 552*b* in the second inner portion 552A are the same as each other. As a result, it is not necessary to complicatedly design the shapes of the second portions 552 and 562 for the first portions 551 and 561. In this manner, the nozzle module 52 can be easily designed and manufactured.

In addition, each of the platform members 54 has the inner curved surfaces 553*a*, 553*b*, 553*c*, and 553*e* and the outer curved surfaces 563*a*, 563*b*, 563*c*, and 563*e* on at least one of the first side Da1 and the second side Da2 in the circumferential direction Dc, when viewed in the radial direction Dr. In this manner, connecting portions between the first inner side surfaces 551*a*, 551*b*, 551*c*, and 551*d*, and the second inner side surfaces 552*a*, 552*b*, 552*c*, and 552*d*, and connecting portions between the first outer side surfaces 561*a*, 561*b*, 561*c*, and 561*d*, and the second outer side surfaces 562*a*, 562*b*, 562*c*, and 562*d* are smoothly connected. Therefore, when each of the platform members 54 is manufactured, the first side surface and the second side surface can be easily processed as continuous surfaces.

In addition, in the second nozzle module 52B, the third nozzle module 52C, and the fourth nozzle module 52D, the second portions 552 and 562 have the third inner side surfaces 558*c*, 558*d*, and 558*e* extending in the axial direction Da and the third outer side surfaces 568*c*, 568*d*, and 568*e*. In this manner, surfaces parallel to the first inner side surfaces 551*a*, 551*b*, 551*c*, and 551*d* and the first outer side surfaces 561*a*, 561*b*, 561*c*, and 561*d* are formed in the second portions 552 and 562. In this manner, when the nozzle ring 51 is configured to include the upper half nozzle ring 511 and the lower half nozzle ring 512 which are split into two in the vertical direction Dv, a split surface between the upper half nozzle ring 511 and the lower half nozzle ring 512 can also be formed in the second portions 552 and 562. In particular, in the present embodiment, the first inner side surface 551*a*, the third inner side surface 558*c*, and the third inner side surface 558*d*, the first outer side surface 561*a*, the third outer side surface 568*c*, and the third outer side surface 568*d*, and the first inner side surface 551*d* and the third inner side surface 558*e*, and the first outer side surface 561*d* and the third outer side surface 568*e* continuously and extend in a linear shape, when viewed in the radial direction Dr. In this manner, the split surface between the upper half nozzle ring 511 and the lower half nozzle ring 512 can be easily formed in the linear shape extending in the axial direction Da.

In addition, the platform member 54 of each of the nozzle modules 52 has the inner-side outer peripheral surface 55*g* and the outer-side outer peripheral surface 56*g* which extend in the circumferential direction Dc to a side opposite to the inner-side inner peripheral surface 55*f* and the outer-side inner peripheral surface 56*f* connected to the nozzle body 53, and are parallel to the central axis O, when viewed in the circumferential direction Dc. Therefore, the inner-side outer peripheral surface 55*g* and the outer-side outer peripheral surface 56*g* which are the outermost sides of the platform member 54 in the radial direction Dr are in a state of extending straight in the axial direction Da. Therefore, both have a simple shape so that a boundary between the outer peripheral surface of the inner ring 6 facing the inner-side outer peripheral surface 55*g* in the radial direction Dr and the inner-side outer peripheral surface 55*g*, and a boundary between the inner peripheral surface of the outer ring 7 facing the outer-side outer peripheral surface 56*g* in the radial direction Dr and the outer-side outer peripheral surface 56*g* form a straight line extending parallel to the central axis O when viewed in the circumferential direction Dc. In this manner, welding work is facilitated when the inner welding portion 58 or the outer welding portion 59 is formed. Therefore, welding workability can be improved when the platform member 54 and the inner ring 6 or the outer ring 7 are joined by welding.

In addition, as the platform member 54 of each of the nozzle modules 52, the inner platform member 55 and the outer platform member 56 are provided. Therefore, the inner platform member 55 and the outer platform member 56 can be firmly connected across the nozzle body 53 on both sides in the radial direction Dr. Therefore, the relative positional deviation in the axial direction Da can be more effectively prevented.

In addition, in the first inner portions 551A, 551B, 551C, and 551D and the first outer portions 561A, 561B, 561C, and 561D, the intervals L1 and L3 are different from each other, and the sizes are different from each other. Similarly, in the second inner portions 552A, 552B, 552C, and 552D and the second outer portions 562A, 562B, 562C, and 562D, the intervals L2 and L3 are different from each other, and the sizes are different from each other. Therefore, the shape of the platform member 54 is changed across the nozzle body 53 on both sides in the radial direction Dr. In this manner, the nozzle module 52 can be properly formed in accordance with the shape or the size of the inner ring 6 or the outer ring 7.

In addition, in the nozzle diaphragm 5 and the method S10 for assembling the nozzle diaphragm 5, the nozzle ring 51 is formed by aligning the plurality of nozzle modules 52 configured as described above between the inner ring 6 and the outer ring 7. As a result, the nozzle diaphragm 5 including the highly accurate nozzle ring 51 can be easily and reliably manufactured.

In addition, in the nozzle diaphragm 5, the inner ring 6 and the platform member 54 are joined together in the inner welding portion 58, and the outer ring 7 and the platform member 54 are joined together in the outer welding portion 59. As a result, the nozzle diaphragm 5 including the highly accurate nozzle ring 51 can be firmly manufactured.

In addition, the nozzle diaphragm 5 includes a plurality of first nozzle modules 52A having the same shape. Since the plurality of first nozzle modules 52A having the same shape are provided, the number of types of components forming the nozzle ring 51 can be minimized. Therefore, the nozzle modules 52 forming the nozzle ring 51 can be efficiently manufactured.

In the steam turbine 1 and the method S20 for assembling the steam turbine 1 configured as described above, the highly accurate nozzle diaphragm 5 formed by using the nozzle module 52 configured as described above is used. Accordingly, the steam turbine 1 can be manufactured by improving work efficiency during the assembly.

In the method S30 for disassembling the steam turbine 1 configured as described above, the steam turbine 1 can be easily disassembled by using the nozzle module 52 configured as described above.

OTHER EMBODIMENTS

Hitherto, the embodiment of the present disclosure has been described in detail with reference to the drawings. However, a specific configuration is not limited to the embodiment, and includes a design change within the scope not departing from the concept of the present disclosure.

In the above-described embodiment, a configuration is adopted in which the casing 2 is vertically divided into two such as the upper half casing 21 and the lower half casing 22. In a state where the upper half casing 21 is removed, the rotor 3 and the nozzle diaphragm 5 are incorporated and removed. However, the present disclosure is not limited thereto. For example, the casing 2 may be configured to have a tubular shape extending in the axial direction Da, and a configuration may be adopted in which the rotor 3 and the nozzle diaphragm 5 are incorporated and removed by being moved to the casing 2 in the axial direction Da.

In addition, in the above-described embodiment, procedures of the method S10 for assembling the nozzle diaphragm 5, the method S20 for assembling the steam turbine 1, and the method S30 for disassembling the steam turbine 1 have been described. However, the procedures can be changed as appropriate.

The nozzle module 52, the nozzle diaphragm 5, the steam turbine 1, the method S10 for assembling the nozzle diaphragm 5, the method S20 for assembling the steam turbine 1, and the method S30 for disassembling the steam turbine 1 which are described in the embodiment can be understood as follows, for example.

(1) According to a first aspect, there is provided the nozzle module 52 forming the nozzle ring 51 to be disposed between the inner ring 6 extending in the circumferential direction Dc around the central axis O and the outer ring 7 disposed on the outer side Dro of the inner ring 6 in the radial direction Dr from the central axis O and extending in the circumferential direction Dc. The nozzle module 52 includes the nozzle body 53 having a blade shape in a cross section and extending in the radial direction Dr, and the platform member 54 integrally connected to an end portion of the nozzle body 53 in the radial direction Dr. The platform member 54 includes the first portions 551, 551A, 551B, 551C, 551D, 561, 561A, 561B, 561C, and 561D formed on the first side Da1 in the axial direction Da in which the central axis O extends at the platform member 54, and having the pair of first side surfaces 551*a*, 551*b*, 551*c*, 551*d* extending in the axial direction Da, when viewed in the radial direction Dr, and the second portions 552, 552A, 552B, 552C, 552D, 562, 562A, 562B, 562C, and 562D formed to extend to the second side Da2 is in the axial direction Da with respect to the first portions 551, 551A, 551B, 551C, 551D, 561, 561A, 561B, 561C, and 561D at the platform member 54, and having second side surfaces 552*a*, 552*b*, 552*c*, 552*d*, 562*a*, 562*b*, 562*c*, and 562*d* extending obliquely with respect to the first side surfaces 551*a*, 551*b*, 551*c*, and 551*d*, when viewed in the radial direction Dr.

In this manner, the second portions 552 and 562 extend obliquely to be curved with respect to the first portions 551 and 561, when viewed in the radial direction Dr. Since the first portions 551 and the second portions 552 are combined in this way, the relative positional deviation in the axial direction Da between the nozzle modules 52 can be prevented. As a result, the plurality of nozzle modules 52 can be highly accurately and reliably assembled while the positional deviation is prevented. In addition, the first side surfaces 551*a*, 551*b*, 551*c*, 551*d*, 561*a*, 561*b*, 561*c*, and 561*d* extend parallel to the central axis O. Therefore, when the plurality of nozzle modules 52 are aligned, the highly accurate nozzle ring 51 can be easily formed simply by aligning the first portions 551 and 561. In this manner, it is possible to obtain the nozzle module 52 which enables the highly accurate nozzle ring 51 to be easily and reliably manufactured.

(2) In the nozzle module 52 according to a second aspect, in the nozzle module 52 of (1), the first portions 551, 551A, 551B, 551C, 551D, 561, 561A, 561B, 561C, 561D are disposed to overlap the end portion 53*a* of the nozzle body 53 on the first side Da1 in the axial direction Da, when viewed in the radial direction Dr, and the second portions 552, 552A, 552C, 552D, 562, 562A, 562C, and 562D are disposed to overlap the end portion 53*b* of the nozzle body 53 on the second side Da2 in the axial direction Da, when viewed in the radial direction Dr.

In this manner, the platform member 54 can be formed in a shape corresponding to a shape of the nozzle body 53 having a blade shape. As a result, the platform member 54 having the first portion and the second portion can be formed to have a minimum size while the nozzle body 53 is stably supported.

(3) In the nozzle module 52 according to a third aspect, in the nozzle module 52 of (1) or (2), the second portions 552, 552A, 552C, 562, 562A, 562C have the pair of second side surfaces 552*a*, 552*b*, 562*a*, and 562*b*, when viewed in the radial direction Dr, and the interval L1 between the pair of first side surfaces 551*a*, 551*b*, 551*c*, and 551*d* and the interval L2 between the pair of second side surfaces 552*a*, 552*b*, 562*a*, and 562*b* are equal to each other, when viewed in the radial direction Dr.

In this manner, it is not necessary to complicatedly design the shapes of the second portions 552 and 562 for the first portions 551 and 561. In this manner, the nozzle module 52 can be easily designed and manufactured.

(4) In the nozzle module 52 according to a fourth aspect, in the nozzle module 52 of any one of (1) to (3), the platform member 54 has the curved surfaces 553*a*, 553*b*, 553*c*, 553*e*, 563*a*, 563*b*, 563*c*, and 563*e* curved and connected between the first side surfaces 551*a*, 551*b*, 551*c*, 551*d*, 561*a*, 561*b*, 561*c*, and 561*d* and the second side surfaces 552*a*, 552*b*, 552*c*, 552*d*, 562*a*, 562*b*, 562*c* and 562*d*, on at least one of the first side Da1 and the second side Da2 in the circumferential direction Dc at the platform member 54, when viewed in the radial direction Dr.

In this manner, the connecting portions between the first side surfaces 551*a*, 551*b*, 551*c*, 551*d*, 561*a*, 561*b*, 561*c*, and 561*d* and the second side surfaces 552*a*, 552*b*, 552*c*, 552*d*, 562*a*, 562*b*, 562*c*, and 562*d* are smoothly connected. Therefore, when each of the platform members 54 is manufactured, the first side surface and the second side surface can be easily processed as continuous surfaces.

(5) In the nozzle module 52 according to a fifth aspect, in the nozzle module 52 of any one of (1) to (4), the second portions 552, 552B, 552C, 552D, 562, 562B, 562C, 562D have the third side surfaces 558*c*, 558*d*, 558*e*, 568*c*, 568*d* and 568*e* parallel to the first side surfaces 551*a*, 551*b*, 551*c*, 551*d*, 561*a*, 561*b*, 561*c* and 561*d* and extending in the axial direction Da.

In this manner, the surfaces parallel to the first side surfaces 551*a*, 551*b*, 551*c*, 551*d*, 561*a*, 561*b*, 561*c*, and 561*d* are formed in the second portions 552 and 562. In this manner, when the nozzle ring 51 is configured to include the upper half nozzle ring 511 and the lower half nozzle ring 512 which are split into two in the vertical direction Dv, a split surface between the upper half nozzle ring 511 and the lower half nozzle ring 512 can also be formed in the second portions 552 and 562.

(6) In the nozzle module 52 according to a sixth aspect, in the nozzle module 52 of any one of (1) to (5), the platform member 54 has the inner peripheral surfaces 55*f*, 56*f* connected to the nozzle body 53, and the outer peripheral surfaces 55*g* and 56*g* facing the side opposite to the inner peripheral surfaces 55*f* and 56*f* in the radial direction Dr. The outer peripheral surfaces 55*g* and 56*g* extends in the circumferential direction Dc to intersect with the first side surfaces 551*a*, 551*b*, 551*c*, 551*d*, 561*a*, 561*b*, 561*c*, 561*d* and the second side surfaces 552*a*, 552*b*, 552*c*, 552*d*, 562*a*, 562*b*, 562*c*, and 562*d*, and is formed parallel to the central axis, when viewed in the circumferential direction Dc.

In this manner, the outer peripheral surfaces 55*g* and 56*g* on the outermost side of the platform member 54 in the radial direction Dr are in a state of extending straight in the axial direction Da. Therefore, both have a simple shape so that the boundary between the inner ring 6 and the outer ring 7 which face the outer peripheral surfaces 55*g* and 56*g* in the radial direction Dr forms a straight line extending parallel to the central axis O, when viewed in the circumferential direction Dc. In this manner, welding work is facilitated during welding. Therefore, welding workability can be improved when the platform member 54 and the inner ring 6 or the outer ring 7 are joined by welding.

(7) In the nozzle module 52 according to a seventh aspect, in the nozzle module 52 of any one of (1) to (6), the platform member 54 includes the inner platform member 55 integrally connected to the inner peripheral end portion 53*i* on the inner side Dri in the nozzle body 53 in the radial direction Dr, and the outer platform member 56 integrally connected to the outer peripheral end portion 53*o* on the outer side Dro in the nozzle body 53 in the radial direction Dr. The inner platform member 55 has the first inner portion 551, 551A, 551B, 551C, and 551D as the first portions, and the second inner portion 552, 552A, 552B, 552C, and 552D as the second portions. The outer platform member 56 has the first outer portions 561, 561A, 561B, 561C, and 561D as the first portions, and the second outer portions 562, 562A, 562B, 562C, 562D as the second portions. The first inner portions 551, 551A, 551B, 551C, and 551D and the first outer portions 561, 561A, 561B, 561C, and 561D, and the second inner portions 552, 552A, 552B, 552C, and 552D and the second outer portions 562, 562A, 562B, 562C, and 562D each are formed in different shapes.

In this manner, the inner platform member 55 and the outer platform member 56 can be firmly connected across the nozzle body 53 on both sides in the radial direction Dr. Therefore, the relative positional deviation in the axial direction Da can be more effectively prevented. Furthermore, the shape of the platform member 54 is changed across the nozzle body 53 on both sides in the radial direction Dr. In this manner, the nozzle module 52 can be properly formed in accordance with the shape or the size of the inner ring 6 or the outer ring 7.

(8) According to an eighth aspect, there is provided a nozzle diaphragm 5 including any one of the nozzle modules 52 of (1) to (7), the inner ring 6 disposed on the inner side Dri in the radial direction Dr with respect to the nozzle module 52 and extending in the circumferential direction Dc, and the outer ring 7 disposed on the outer side Dro in the radial direction Dr with respect to the nozzle module 52 and extending in the circumferential direction Dc. A plurality of the nozzle modules 52 are aligned between the inner ring 6 and the outer ring 7 to form a nozzle ring 51.

In this manner, the nozzle diaphragm 5 including the highly accurate nozzle ring 51 can be easily and reliably manufactured.

(9) In the nozzle diaphragm 5 according to a ninth aspect, the nozzle diaphragm 5 of (8) further includes the inner welding portion 58 formed between the inner ring 6 and the plurality of platform members 54 and joining the inner ring 6 and each of the platform members 54, and the outer welding portion 59 formed between the outer ring 7 and the plurality of platform members 54 and joining the outer ring 7 and each of the platform members 54.

In this manner, the nozzle diaphragm 5 having the highly accurate nozzle ring 51 can be firmly manufactured.

(10) In the nozzle diaphragm 5 according to a tenth aspect, the nozzle diaphragm 5 of (8) or (9) further includes the plurality of nozzle modules 52 having the same shape.

In this way, since the plurality of nozzle modules 52A having the same shape are provided, the number of types of components forming the nozzle ring 51 can be minimized. Therefore, the nozzle modules 52 forming the nozzle ring 51 can be efficiently manufactured.

(11) According to an eleventh aspect, there is provided a steam turbine 1 including the nozzle diaphragm 5 of any one of (8) to (10), the casing 2 disposed on the outer side Dro of the nozzle diaphragm 5 in the radial direction Dr, extending in the axial direction Da, and having a tubular shape, and the rotor 3 disposed to be rotatable around the central axis O with respect to the nozzle diaphragm 5 and the casing 2, and accommodated in the casing 2.

In this manner, the steam turbine 1 can be manufactured by improving work efficiency during assembly.

(12) According to a twelfth aspect, there is provided the method S10 for assembling the nozzle diaphragm 5. The method S10 for assembling the nozzle diaphragm 5 of any one of (8) to (10) includes Step S11 of preparing the inner ring 6, the outer ring 7, and the plurality of nozzle modules 52, Step S12 of disposing the inner ring 6, Step S13 of disposing each of the nozzle modules 52 on the outer side Dro of the inner ring 6 in the radial direction Dr, Step S14 of disposing the outer ring 7 on the outer side Dro of the plurality of nozzle modules 52 in the radial direction Dr, Step S15 of welding the inner ring 6 and the platform member 55, and Step S16 of welding the outer ring 7 and the platform member 56.

In this manner, the nozzle diaphragm 5 including the highly accurate nozzle ring 51 can be easily and reliably manufactured.

(13) According to a thirteenth aspect, there is provided the method S20 for assembling the steam turbine 1 which includes Step S21 of preparing the casing 2, and Step S22 of incorporating the nozzle diaphragm 5 of any one of (8) to (10) into the casing 2.

In this manner, the steam turbine 1 can be manufactured by improving work efficiency during assembly.

(14) According to a fourteenth aspect, there is provided the method S30 for disassembling the steam turbine 1 which includes Step S31 of opening a part of the casing 2, and Step S32 of removing the nozzle diaphragm 5 of any one of (8) to (10) from the casing 2.

In this manner, the steam turbine 1 can be easily disassembled.

EXPLANATION OF REFERENCES

1: steam turbine
2: casing
3: rotor
5: nozzle diaphragm
6: inner ring
7: outer ring
21: upper half casing
22: lower half casing
27: steam inlet
28: steam outlet
31: rotary shaft
31*a*, 31*b*: end portion
32: rotor blade
33A: first bearing
33B: second bearing
51: nozzle ring
52: nozzle module
52A: first nozzle module
52B: second nozzle module
52C: third nozzle module
52D: fourth nozzle module
53: nozzle body
53*a*, 53*b*: end portion
53*i*: inner peripheral end portion
53*o*: outer peripheral end portion
54: platform member
54*f*: inner peripheral surface
54*g*: outer peripheral surface
55, 55A, 55B, 55C, 55D: inner platform member
55*f*: inner-side inner peripheral surface
55*g*: inner-side outer peripheral surface
56, 56A, 56B, 56C, 56D: outer platform member
56*f*: outer-side inner peripheral surface
56*g*: outer-side outer peripheral surface
58: inner welding portion
59: outer welding portion
61: upper half inner ring member
61*a*, 61*b*: end portion
62: lower half inner ring member
62*a*, 62*b*: end portion
71: upper half outer ring member
71*a*, 71*b*: end portion
72: lower half outer ring member
72*a*, 72*b*: end portion
511: upper half nozzle ring
511*f*, 511*g*: upper half ring split surface
512: lower half nozzle ring
512*f*, 512*g*: lower half ring split surface
551, 551A, 551B, 551C, 551D: first inner portion (first portion)
551*a*, 551*b*, 551*c*, 551*d*: first inner side surface (first side surface)
551*f*, 551*g*: inner front surface (front surface)
552, 552A, 552B, 552C, 552D: second inner portion (second portion)
552*a*, 552*b*, 552*c*, 552*d*: second inner side surface (second side surface)

552*r*, 552*s*, 552*t*: inner rear surface (rear surface)
553*a*, 553*b*, 553*c*, 553*e*: inner curved surface (curved surface)
558*c*, 558*d*, 558*e*: third inner side surface (third side surface)
561, 561A, 561B, 561C, 561D: first outer portion (first portion)
561*a*, 561*b*, 561*c*, 561*d*: first outer side surface (first side surface)
561*f*, 561*g*: outer front surface (front surface)
562, 562A, 562B, 562C, 562D: second outer portion (second portion)
562*a*, 562*b*, 562*c*, 562*d*: second outer side surface (second side surface)
562*r*, 562*s*, 562*t*: outer rear surface (rear surface)
563*a*, 563*b*, 563*c*, 563*e*: outer curved surface (curved surface)
568*c*, 568*d*, 568*e*: third outer side surface (third side surface)
Da: axial direction
Da1: first side (axial direction)
Da2: second side (axial direction)
Dc: circumferential direction
Dc1: first side (circumferential direction)
Dc2: second side (circumferential direction)
Dr: radial direction
Dri: inner side
Dro: outer side
Dv: vertical direction
Dvu: upward
Dvd: downward
L1, L2, L3, L4, L5, L6: interval
O: central axis
S10: method for assembling nozzle diaphragm
S11: step of preparing inner ring, outer ring, and nozzle module
S12: step of disposing inner ring
S13: step of disposing nozzle module
S14: step of disposing outer ring
S15: step of welding inner ring and inner platform member
S16: step of welding outer ring and outer platform member
S20: method for assembling steam turbine
S21: step of preparing casing
S22: step of incorporating nozzle diaphragm
S23: step of closing casing
S30: method for disassembling steam turbine
S31: step of opening part of casing
S32: step of removing nozzle diaphragm

What is claimed is:

1. A nozzle ring to be disposed between an inner ring extending in a circumferential direction around a central axis and an outer ring disposed outward of the inner ring in a radial direction from the central axis and extending in the circumferential direction, the nozzle ring comprising:

an upper half nozzle ring disposed upward in a vertical direction with reference to the central axis and has a semi-annular shape formed around the central axis, and a lower half nozzle ring disposed downward has a semi-annular shape formed around the central axis, wherein the upper half nozzle ring and the lower half nozzle ring each comprise a plurality of nozzle modules, each of the plurality of nozzle modules comprises:

a nozzle body having a blade shape in a cross section and extending in the radial direction; and a platform member integrally connected to an end portion of the nozzle body in the radial direction, the platform member comprises:

a first portion formed on a first side in an axial direction in which the central axis extends at the platform member and having a pair of first side surfaces extending in the axial direction when viewed in the radial direction; and a second portion formed to extend to a second side in the axial direction with respect to the first portion at the platform member and having a second side surface extending obliquely with respect to the pair of first side surfaces when viewed in the radial direction, the plurality of nozzle modules includes:

first nozzle modules;

a second nozzle module;

a third nozzle module; and a fourth nozzle module, the first nozzle modules, the second nozzle module, the third nozzle module, and the fourth nozzle module each have a different configuration of the platform member, the second nozzle module and the third nozzle module are disposed in an end portion on a first side in the circumferential direction in the upper half nozzle ring and the lower half nozzle ring, the fourth nozzle module is disposed in an end portion on a second side in the circumferential direction in the upper half nozzle ring and the lower half nozzle ring, and the first nozzle modules are disposed between the fourth nozzle module, and the second nozzle module and the third nozzle module in the circumferential direction in the upper half nozzle ring and the lower half nozzle ring.

2. The nozzle ring according to claim 1, wherein the first portion overlaps the end portion of the nozzle body on the first side in the axial direction when viewed in the radial direction, and the second portion overlaps the end portion of the nozzle body on the second side in the axial direction when viewed in the radial direction.

3. The nozzle ring according to claim 1, wherein the second side surface comprises a pair of second side surface portions, and an interval between the pair of first side surfaces is equal to an interval between the pair of second side surface portions when viewed in the radial direction.

4. The nozzle ring according to claim 1, wherein the platform member has a curved surface curved and connected between one of the first side surfaces and the second side surface on at least one of a first side and a second side in the circumferential direction at the platform member when viewed in the radial direction.

5. The nozzle ring according to claim 1, wherein the second portion has a third side surface parallel to the pair of first side surfaces and extending in the axial direction when viewed in the radial direction.

6. The nozzle ring according to claim 1, wherein the platform member has:

an inner peripheral surface connected to the nozzle body, and an outer peripheral surface facing a side opposite to the inner peripheral surface in the radial direction, and the outer peripheral surface extends in the circumferential direction to intersect with the pair of first side surfaces and the second side surface and is parallel to the central axis when viewed in the circumferential direction.

7. The nozzle ring according to claim 1, wherein the platform member comprises:

an inner platform member integrally connected to an inner peripheral end portion of the nozzle body disposed radially inward, and an outer platform member integrally connected to an outer peripheral end portion of the nozzle body disposed radially outward, in the inner platform member, the first portion is a first inner portion as the first portion, and the second portion is a second inner portion, in the outer platform member, the first portion is a first outer portion, and the second portion is a second outer portion, the first inner portion and the first outer portion are formed in different shapes, and the second inner portion and the second outer portion are formed in different shapes.

8. A nozzle diaphragm comprising:

the nozzle ring according to claim 1;

an inner ring disposed inside the plurality of nozzle modules in the radial direction and extending in the circumferential direction; and an outer ring disposed outside the plurality of nozzle modules in the radial direction and extending in the circumferential direction, wherein the plurality of nozzle modules are aligned between the inner ring and the outer ring to form a nozzle ring.

9. The nozzle diaphragm according to claim 8, further comprising:

an inner welding portion between the inner ring and the platform member of each of the plurality of nozzle modules that joins the inner ring and the platform member; and an outer welding portion between the outer ring and the platform member of each of the plurality of nozzle modules that joins the outer ring and the platform member.

10. The nozzle diaphragm according to claim 8, the plurality of nozzle modules have a same shape.

11. A steam turbine comprising:

the nozzle diaphragm according to claim 8;

a casing disposed outside the nozzle diaphragm in the radial direction, extending in the axial direction, and having a tubular shape; and a rotor disposed to be rotatable around the central axis with respect to the nozzle diaphragm and the casing and accommodated in the casing.

12. A method for assembling the nozzle diaphragm according to claim 8, the method comprising:

a step of preparing the inner ring, the outer ring, and the plurality of nozzle modules;

a step of disposing the inner ring;

a step of disposing each of the plurality of nozzle modules outside the inner ring in the radial direction;

a step of disposing the outer ring outside the plurality of nozzle modules in the radial direction;

a step of welding the inner ring and the platform member of each of the plurality of nozzle modules; and a step of welding the outer ring and the platform member of each of the plurality of nozzle modules.

13. A method for assembling a steam turbine, comprising:

a step of preparing a casing; and a step of incorporating the nozzle diaphragm according to claim 8 into the casing.

14. A method for disassembling a steam turbine, comprising:

a step of opening a part of a casing; and a step of removing the nozzle diaphragm according to claim 8 from the casing.

* * * * *